US011142207B2

(12) United States Patent
Ford et al.

(10) Patent No.: US 11,142,207 B2
(45) Date of Patent: Oct. 12, 2021

(54) METHODS AND SYSTEMS FOR NVH-BASED VEHICLE POWERTRAIN CONTROL

(71) Applicant: Ford Global Technologies, LLC, Dearborn, MI (US)

(72) Inventors: Stuart N. Ford, Farmington Hills, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 16/455,296

(22) Filed: Jun. 27, 2019

(65) Prior Publication Data
US 2020/0010089 A1 Jan. 9, 2020

Related U.S. Application Data

(60) Provisional application No. 62/695,612, filed on Jul. 9, 2018.

(51) Int. Cl.
*B60W 30/20* (2006.01)
*B60W 10/06* (2006.01)
*F02D 41/00* (2006.01)
*B60N 2/00* (2006.01)
*G05D 1/00* (2006.01)
*B60W 40/08* (2012.01)

(52) U.S. Cl.
CPC ............ *B60W 30/20* (2013.01); *B60N 2/002* (2013.01); *B60W 10/06* (2013.01); *B60W 40/08* (2013.01); *F02D 41/0087* (2013.01); *G05D 1/0088* (2013.01); *B60W 2040/0881* (2013.01); *B60W 2710/0666* (2013.01)

(58) Field of Classification Search
CPC ...... B60W 30/20; B60W 10/06; B60W 40/08; B60W 2710/0666; B60W 2040/0881; B60W 40/13; B60W 10/02; B60W 20/10; B60W 20/17; B60W 10/026; B60W 10/024; B60W 10/08; B60W 10/11; B60W 10/10; B60W 10/30; B60W 30/182; B60W 2540/229; B60W 2540/10; B60W 2540/12; B60W 2540/18; B60W 2540/049; B60W 2540/227; B60W 20/15; F02D 41/0087; F02D 41/1497; F02D 2200/025; F02D 2200/50; B60N 2/002; G05D 1/0088; Y02T 10/62; Y02T 10/40; Y02T 10/84
USPC ......................................................... 701/23
See application file for complete search history.

(56) References Cited

U.S. PATENT DOCUMENTS 7,785,230 B2 * 8/2010 Gibson ................. B60W 30/20
477/62
9,308,891 B2 * 4/2016 Cudak .................... B60K 35/00
(Continued)

*Primary Examiner* — Jonathan M Dager
*Assistant Examiner* — Jean W Charleston
(74) *Attorney, Agent, or Firm* — Geoffrey Brumbaugh; McCoy Russell LLP

(57) ABSTRACT

Methods and systems are provided for adjusting noise, vibration, and harshness (NVH) limits for a vehicle based on an occupancy level of the vehicle. The occupancy level is inferred based on a number of occupants and their position within a vehicle, and further based on a degree of interaction of a primary occupant with vehicle controls. As the occupancy level decreases, NVH constraints for operating the vehicle are reduced and one or more vehicle operating parameters nay be based on the reduced NVH constraints.

17 Claims, 13 Drawing Sheets

(56) References Cited

U.S. PATENT DOCUMENTS

| | | | |
|---|---|---|---|
| 10,214,219 B2* | 2/2019 | Richards | F02P 5/1508 |
| 2015/0149023 A1* | 5/2015 | Attard | B60R 16/037 |
| | | | 701/28 |
| 2016/0328976 A1* | 11/2016 | Jo | B60W 10/06 |
| 2017/0227959 A1 | 8/2017 | Lauffer et al. | |
| 2018/0046184 A1 | 2/2018 | Subramanian et al. | |
| 2018/0113461 A1* | 4/2018 | Potnis | B60W 50/00 |
| 2018/0130347 A1* | 5/2018 | Ricci | G08G 1/0129 |
| 2018/0141562 A1* | 5/2018 | Singhal | G01C 21/3407 |
| 2018/0170307 A1* | 6/2018 | Boran | B60R 21/01554 |
| 2018/0194356 A1* | 7/2018 | Richards | B60W 30/182 |

* cited by examiner

METHODS AND SYSTEMS FOR NVH-BASED VEHICLE POWERTRAIN CONTROL

CROSS REFERENCE TO RELATED APPLICATIONS

The present application claims priority to U.S. Provisional Application No. 62/695,612, entitled "Methods and Systems for NVH-Based Vehicle Powertrain Control", and filed on Jul. 9, 2018. The entire contents of the above-listed application are hereby incorporated by reference for all purposes.

FIELD

The present description relates generally to methods and systems for controlling a vehicle engine and an associated powertrain during an autonomous mode of operation.

BACKGROUND/SUMMARY

Noise, Vibration, and Harshness (NVH) behavior of a vehicle is significantly influenced by the vehicle's powertrain. For example, NVH may result from vibration due to combustion quality issues, torque converter operation, variable displacement cylinder switching, transmission gear shifting, etc. For example, cylinder deactivation causes lower frequency and higher amplitude torque vibrations at the crankshaft. These vibrations can be transmitted through components such as seats, steering wheel etc., to the vehicle occupants, thereby generating undesirable noise within the vehicle cabin. As another example, transmissions experience noises such as gear meshing noise and pump noise. Furthermore, gasoline engines experience noise from sources such as direct-injection fuel systems. To improve driver perception of vehicle drivability and performance, vehicle powertrains may be designed and calibrated to operate in a state where NVH is reduced, such as where driver and passenger experienced NVH is balanced with engine output and emissions efficiency. As an example, variable displacement operation may be limited to certain engine operating regions, such as mid-range engine speeds at low or moderate loads. Additionally, the induction ratios available during a variable displacement mode may be limited in view of the NVH constraints.

However, the inventors have recognized that the methods that limit NVH also have a negative impact on fuel economy. In other words, the instantaneous balance of NVH and other engine attributes can constrain the realized engine efficiency from a theoretical optimal efficiency. That is, when NVH constraints are imposed, fuel economy improvement is reduced. As a result, there is a trade-off between NVH and fuel economy, and the NVH limit becomes the limit for fuel economy improvement that a given technology can provide. With reference to the earlier example, an operating range of fuel saving technologies, such as VDE, is limited due to imposed NVH constraints, reducing the associated fuel economy improvement that can be achieved.

Further, it is assumed that an occupant, such as a primary vehicle driver, will be in the vehicle the entire time that the vehicle is moving, and thus, the NVH limit for a given operation is set and does not change during the lifetime of the vehicle. However, the inventors have recognized that in vehicles with autonomous driving capabilities, the assumption that an occupant will be in the vehicle does not hold. For example, the vehicle may be operated in an autonomous mode without any occupant between passenger pick-up locations or while transferring goods. In addition, the NVH perception for a vehicle driver may be significantly different from that of a vehicle passenger, such as an occupant sitting in a passenger row (behind the driver's seat). Furthermore, the NVH perception of the driver may vary based on how actively they are involved in driving the vehicle. Specifically, NVH is transmitted to an occupant through various vehicle surfaces, such as a seat, a steering wheel, accelerator and brake pedals, cabin walls, etc. If an occupant is not actively interacting with these vehicle surfaces, such as when an occupant is a passenger in a rear seat, or when a driver is controlling the steering wheels while a vehicle controller controls pedal application (e.g., while in the autonomous mode of vehicle operation), the expected NVH is not experienced. During such conditions, the active controls to limit NVH can severely impact fuel economy without making a significant increase in driver comfort.

In one example, the issues described above may be addressed by a method for operating a vehicle, comprising: during an autonomous mode of vehicle operation, estimating an occupancy level of the vehicle based on a number of occupants, a position of each occupant within the vehicle, and a drive activity level of a primary occupant; and altering noise, vibration, and harshness (NVH) limits for a powertrain of the vehicle responsive to the occupancy level. In this way, drivability may be compromised when low vehicle occupancy is detected in order to improve fuel economy.

As one example, when a vehicle is operating in autonomous mode, NVH constraints limiting fuel economy for a given technology may be relaxed by an order based on the occupancy level of the vehicle in order to improve fuel economy. A vehicle controller may identify an occupancy level of the vehicle based on a number of occupants in the vehicle, their position within the cabin (e.g., whether they are in a driver seat or a passenger seat), and further based on their interactions with vehicle surfaces through which NVH is transmitted (such as based on whether a driver is actuating the steering and/or pedals). The occupancy level may be further adjusted based on the presence of cargo. The occupancy level may be determined based on input from various vehicle sensors, such as occupancy sensors, infra-red sensors, microphones, and capacitive touch sensors, as well as based on steering input, brake input, accelerator input, etc. Powertrain calibration settings may then be adjusted based on the occupancy level so as to bias vehicle operating attributes towards smooth and silent operation for increased passenger comfort (or to protect fragile cargo) when the occupancy level is higher. The settings may alternatively be biased towards energy efficiency, while reducing NVH constraints, when the occupancy level is lower. As one example, when the occupancy level is higher (such as when a driver is actively involved in steering and pedal control), transmission shifts may be completed relative more slowly with the use of more torque-compensating spark retard to enable a smoother transition. In comparison, when the occupancy level is lower (such as when the only occupant of an autonomously operating vehicle is a passenger), transmission shifts may be completed substantially instantaneously with the use of less torque-compensating spark retard (e.g., with no spark retard). As other examples, with variably reduced NVH constraints, the operating range of one or more of variable displacement operation, deceleration fuel shut off, exhaust gas recirculation, etc., may be expanded to provide greater fuel economy improvement while compromising NVH. Further, torque converter slip may be adjusted towards less slip to improve fuel economy by reducing torque loss. Furthermore, a system battery may be charged more aggressively, such as by enabling regenerative braking to be extended to lower gears and lower vehicle speeds. As a result, the vehicle may improve fuel economy while balancing NVH to levels that are acceptable based on the occupancy level.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
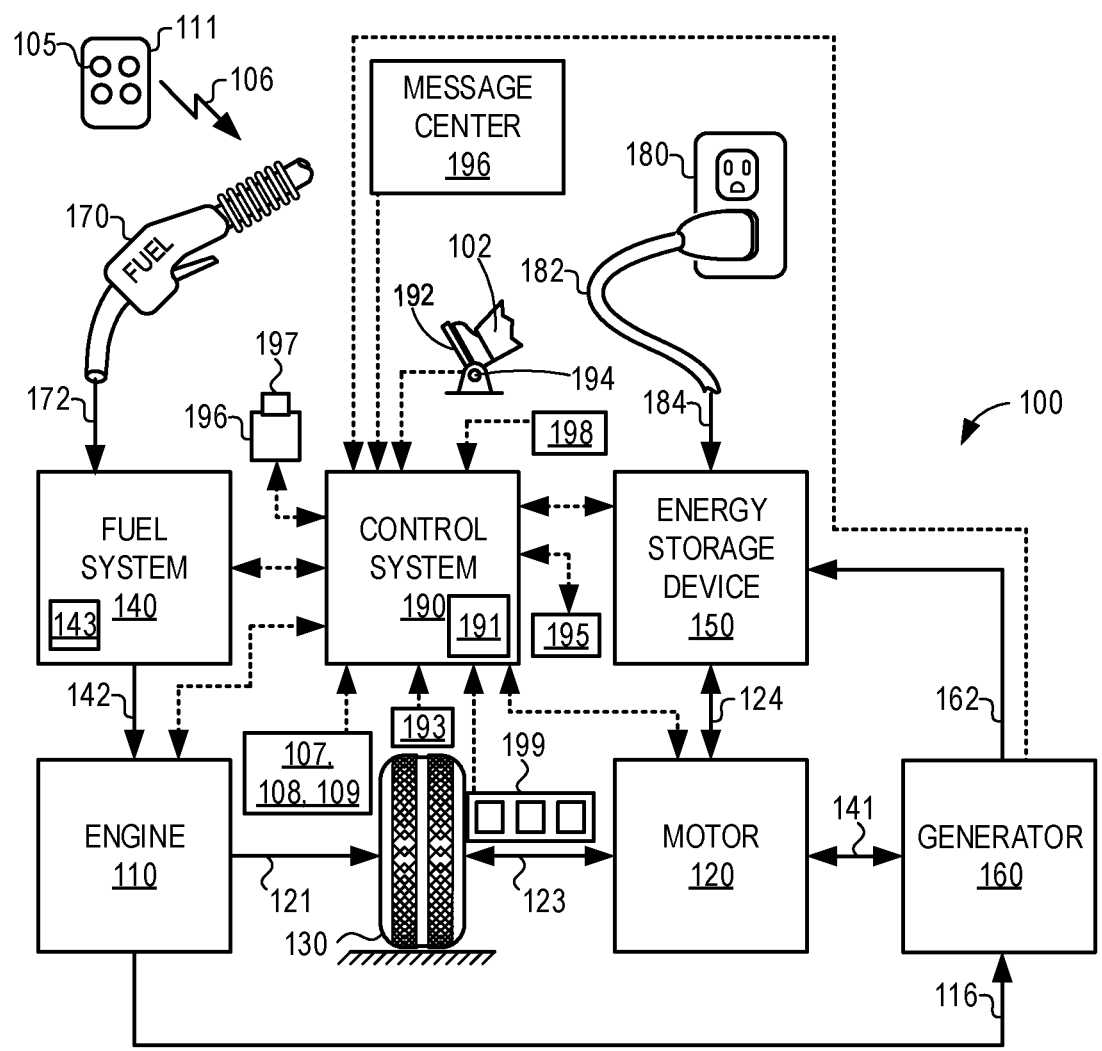
FIG. 1A illustrates an example vehicle propulsion system.

The following description relates to systems and methods for adjusting vehicle operation to alter a balance between fuel economy and noise, vibration, and harshness (NVH) of a vehicle, such as the vehicle shown in FIG. 1A, based on an occupancy level of the vehicle. The vehicle may include an occupant sensing system for detecting a number of occupants present in the vehicle, determining whether the occupant is a driver or a passenger, and determining whether the driver is actively controlling the steering and the pedals. Responsive to a lower occupancy level, vehicle operation may be adjusted to increase fuel economy improvement while compromising NVH. Adjusting vehicle operation may include adjusting the calibration of one or more electronically controlled devices in a driveline of the vehicle, such as the driveline shown in FIG. 2, and settings for an engine, such as the engine shown in FIG. 1B. A vehicle controller may be configured to perform a routine, such as example routine of FIGS. 3 and 4, to determine an occupancy level of the vehicle based on sensor input, and adjust one or more vehicle operating parameters based on the determined occupancy level. Example adjustments to powertrain calibration and settings is shown with reference to FIGS. 5-12. A prophetic example of engine adjustments during vehicle operation is shown at FIG. 13.

FIG. 1A illustrates an example vehicle propulsion system 100. Vehicle propulsion system 100 includes a fuel burning engine 110 and a motor 120. While the vehicle propulsion system 100 illustrated in FIG. 1A is a hybrid-propulsion system, it will be appreciated that the embodiments described herein, including the methods described with respect to FIGS. 3-12 are applicable to vehicle propulsion systems that are solely driven by an engine and are configured with autonomous driving capability.

As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 123 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 121 while motor 120 is deactivated. During other operating conditions, both engine 110 and motor 120 may each be operated to propel the vehicle via drive wheel 130 as indicated by arrows 121 and 123, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 141 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 143 for storing fuel on-board the vehicle. For example, fuel tank 143 may store one or more liquid fuels, including but not limited to: gasoline, diesel, and alcohol fuels. In some examples, the fuel may be stored on-board the vehicle as a blend of two or more different fuels. For example, fuel tank 143 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 121 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Vehicle propulsion system 100 may include a heating ventilation and air conditioning (HVAC) system (not shown). The HVAC system may include an evaporator for cooling vehicle cabin air. Air may be passed over the evaporator via a fan and directed around the vehicle cabin. A climate controller (not shown) may operate the fan according to operator settings (received via an operator interface) as well as climate sensors. Further, the climate controller may operate the fan based on a number of occupants sensed within the vehicle. An evaporator temperature sensor (not shown) may provide an indication of the temperature of evaporator to the climate controller. A cabin temperature sensor may provide an indication of cabin temperature to the climate controller. The climate controller may also receive operator inputs from an operator interface and supply desired evaporator temperature and actual evaporator temperature to control system 190. The operator interface may allow an operator to select a desired cabin temperature, fan speed, and distribution path for conditioned cabin air. In one example, responsive to an occupancy level of the vehicle being lower (such as when there are no occupants in the vehicle, or when the occupant(s) is a passenger rather than a driver, a controller of the control system 190 may increase a desired air conditioning set point, or shut-off the HVAC system so as to reduce the amount of accessory load applied on the engine. Optionally, the controller may lower the desired air conditioning set point or enable the HVAC system when an occupant is picked up (such as when nearing a passenger pick-up location) or when a driver is detected in the vehicle.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 111 having a remote start button 105. In other examples (not shown), a remote engine start may be initiated via a cellular telephone, or smartphone based system where a user's cellular telephone sends data to a server and the server communicates with the vehicle to start the engine.

Further, control system 190 may include an autonomous driving module 191 that comprises instructions for autonomously and/or semi-autonomously, i.e., wholly or partially without operator input, operating the vehicle propulsion system 100. The vehicle propulsion system 100 may further include autonomous driving sensors 193 and an autonomous controller within the module that receives signals generated by the autonomous driving sensors (e.g., sensors for driving the vehicle in an autonomous mode) and controls at least one vehicle subsystem to operate the vehicle in autonomous mode according to the signals received. The autonomous sensors 193 may include any number of devices configured to generate signals that help navigate the vehicle propulsion system 100 while operating in an autonomous mode. Examples of autonomous sensors 193 may include a radar sensor, a lidar sensor, a camera, or the like. The autonomous sensors 193 help the vehicle propulsion system 100 "see" the roadway and/or various obstacles while operating in the autonomous mode.

The autonomous mode controller may be configured to control one or more subsystems while the vehicle propulsion system is operating in the autonomous mode. Examples of subsystems that may be controlled by the autonomous mode controller may include a brake subsystem, a suspension subsystem, a steering subsystem, a HVAC subsystem, and a powertrain subsystem. The autonomous mode controller may control any one or more of these subsystems by outputting signals to control units associated with these subsystems.

While a vehicle is operated in the autonomous mode, vehicle occupants may have varying degrees of interaction with the vehicle. For example, the vehicle may have no occupants. As another example, the vehicle occupant(s) may be a passenger seated in a rear location, and not interacting with any steering or braking controls of the vehicle. As yet another example, the vehicle occupant may be a passive driver seated in a front location, and not interacting with any steering or braking controls of the vehicle. In both these cases, the vehicle controller provides command signals for driving the vehicle, and the vehicle is operated with a higher degree of autonomous driving. As still another example, the vehicle occupant may be an active driver seated interacting with one or more of the steering and braking controls of the vehicle. Based on the level of interaction, the degree of autonomous driving provided via the controller may be varied.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 143 may be configured to store the fuel received from fuel dispensing device 170 until it is supplied to engine 110 for combustion. In some embodiments, control system 190 may receive an indication of the level of fuel stored at fuel tank 143 via a fuel level sensor. The level of fuel stored at fuel tank 143 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and sensors dedicated to indicating the occupancy-state of the vehicle, for example seat load cells 107, door sensing technology 108, onboard cameras 109, and microphones. In some examples, sensors dedicated to indicating occupancy-state of the vehicle may include including one or more of a thermal imaging system including an infra-red camera, and a seat sensing system including one or more seat pressure sensors coupled to each vehicle seat, capacitive touch sensors, and/or infrared eye or face sensors. As elaborated with reference to FIG. 4, vehicle occupancy may also be inferred based on vehicle mass estimates, a priori modus operandi via cloud dispatch or V2V or V2X communications, as well as inputs from accelerator, brake, steering, and range inputs. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Further, in some embodiments, the vehicle instrument panel 196 may include an interface for indicating an occupancy-based mode of vehicle operation. For example, the vehicle occupancy level may dictate a preference for fuel economy over NVH, or vice-versa. Alternatively, the driver may actively select a preference via the interface. As elaborated with reference to FIG. 3, powertrain calibration settings may be selected based on the determined occupancy level of the vehicle to bias the settings towards fuel economy when the occupancy level is lower. Therein, the control unit 190 may reduce NVH constraints, and adjust one or more actuators of the vehicle to control vehicle operation to improve fuel economy. In comparison, the vehicle settings may be biased towards NVH when the occupancy level is higher. Therein the control unit 190 may utilize nominal NVH constraints, and adjust one or more actuators of the vehicle to control vehicle operation to improve drivability and occupant comfort.

The control unit 190 may adjust vehicle operation based on occupancy level in the vehicle, including a number of occupants, nature of the occupants (e.g., driver or passenger), as well as activity level of the occupant (e.g., whether they are interacting with steering and braking controls or not), as described below with respect to FIGS. 3-12. Specifically, when a lower occupancy level is detected within the vehicle (based on indications from the sensors 107, 108, and 109 indicating an occupancy state of the vehicle), the control unit 190 may adjust one or more vehicle operating parameters to adjust a balance between fuel economy and NVH, such that fuel economy improvement is favored over drivability. For example, when zero occupants are detected, when the occupant is a passenger, or when the driver is a passive driver, fewer NVH constraints may be applied (e.g., no NVH constraints may be applied). Therein, vehicle operation may be adjusted for improving fuel economy while compromising NVH as NVH will not drive customer complaints through interaction with the occupant. In this way, by utilizing occupancy level information, the control unit may adjust vehicle operation to allow NVH excitations from the vehicle powertrain, and increase fuel economy. Details of adjusting one or more vehicle operating parameters based on lower occupancy levels are further elaborated below with respect to FIGS. 3-12. The methods and systems described herein provide the technical result of improved fuel economy via reduction of NVH constraints during conditions when NVH constraints are not likely to disturb vehicle occupants.

Figure 1B:
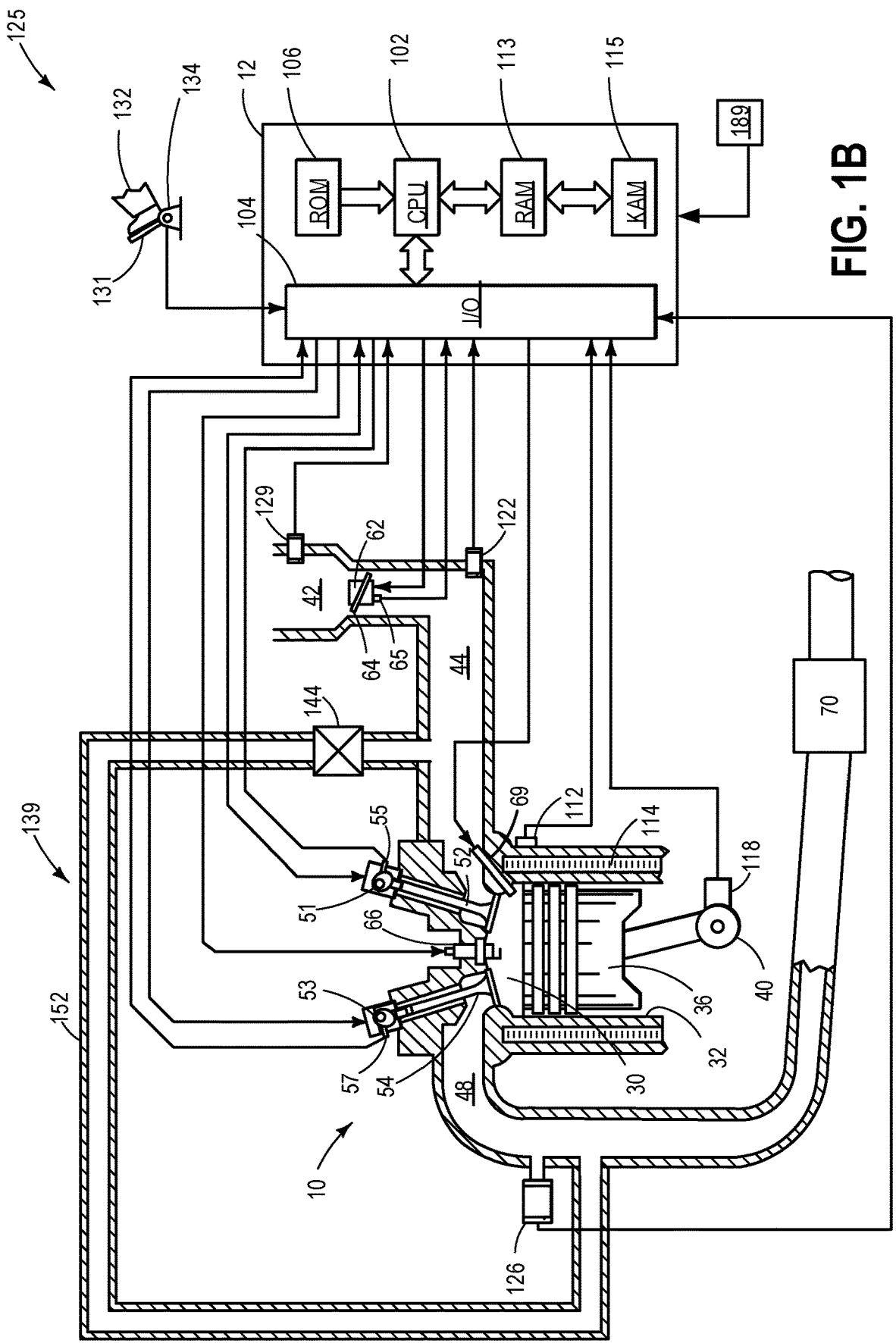
FIG. 1B shows a schematic diagram of an engine.

Continuing to FIG. 1B, a schematic diagram showing one cylinder of a multi-cylinder engine 10 in an engine system 125, which may be included in a propulsion system of an vehicle, such as vehicle propulsion system 100 at FIG. 1A, is shown. The engine 10 may be an example of engine 110 at FIG. 1A. The engine 10 may be controlled at least partially by a control system including a controller 12 and by input from a vehicle operator 132 via an input device 131. In this example, the input device 131 includes an accelerator pedal and a pedal position sensor 134 for generating a proportional pedal position signal.

In some embodiments, during an autonomous mode of vehicle operation, the engine 10 may be controlled at least partially by the control system via instructions stored in the controller 12 (alternatively, an autonomous controller (not shown) may control the engine during the autonomous mode) and by input from one or more autonomous sensors 189. Examples of autonomous sensors 189 may include a radar sensor, a lidar sensor, a camera, or the like.

A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The engine 10 may operate in various modes. For example, the controller 12 may deactivate various numbers of cylinders, such as one cylinder or a plurality of cylinders, and operate the engine with the rest of the cylinders that remain active. In the embodiment illustrated in FIG. 1B, actuation systems for the intake valves 52 and exhaust valves 54 as described above may control valve opening and closing, which can be used to provide one or more reduced displacement operating modes with one or more cylinders deactivated and not combusting fuel. As used herein, a reduced displacement mode includes an engine operating mode where one or more cylinders do not combust fuel to power the crankshaft while deactivated. During the reduced or variable displacement operating modes, one or more cylinders may be deactivated by modifying or disabling operation of the intake valves, exhaust valves, or both in combination with cutting off fuel provided to the deactivated cylinders.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), NOR trap, various other emission control devices, or combinations thereof. In some examples, during operation of the engine 10, the emission control device 70 may be periodically reset by operating at least one cylinder of the engine within a particular air-fuel ratio.

An exhaust gas recirculation (EGR) system 139 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 139 may be used to regulate the temperature of the air-fuel mixture within the combustion chamber, thus providing a method of controlling the timing of ignition during some combustion modes.

The controller 12 is shown in FIG. 1B as a microcomputer, including a microprocessor unit 102, input/output ports 104, an electronic storage medium for executable programs and calibration values shown as read only memory chip 106 (e.g., non-transitory memory) in this particular example, random access memory 113, keep alive memory 115, and a data bus. The controller 12 may receive various signals from sensors coupled to the engine 10, in addition to those signals previously discussed, including measurement of inducted mass air flow (MAF) from the mass air flow sensor 129; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some embodiments, during an autonomous mode of vehicle operation, the engine 10 may be autonomously controlled by the controller 12 based on signals received from autonomous sensors, such as autonomous sensors described with respect to FIG. 1A. In some examples, an autonomous controller within the control module may control engine operation during the autonomous mode.

As described above, FIG. 1B shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures graphically represent code to be programmed into the computer readable storage medium in controller 12 to be carried out by the controller in combination with the engine hardware, as illustrated in FIG. 1B.

Figure 2:
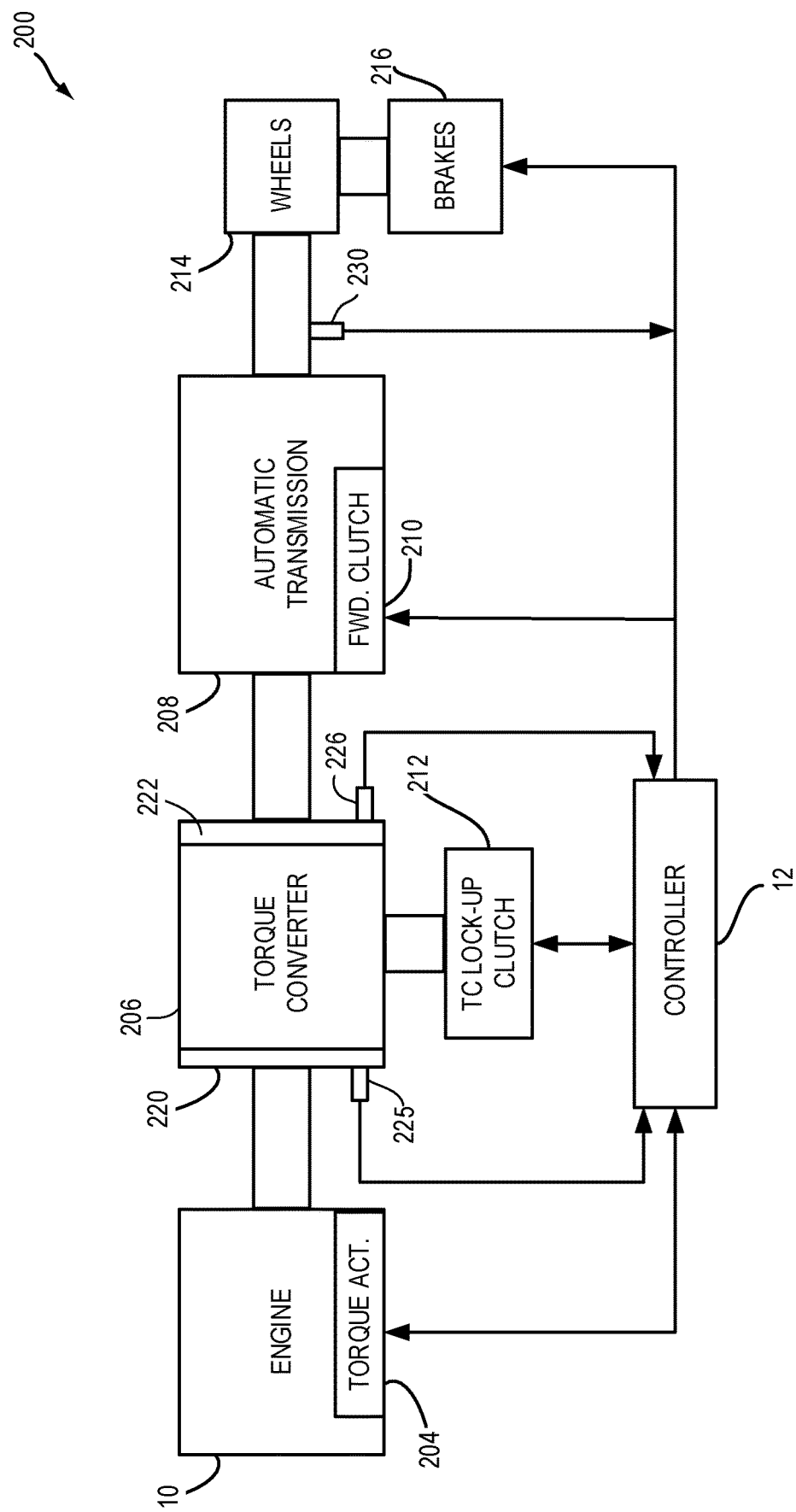
FIG. 2 shows an example vehicle driveline configuration.

FIG. 2 is a block diagram of a vehicle drive-train 200. Drive-train 200 may be powered by engine 10. Engine 10 is described with respect to FIG. 1B. Drive train 200 may be included a vehicle propulsion system, such as vehicle propulsion system 100 in FIG. 1A. In one example, engine 10 may be a gasoline engine. In alternate examples, other engine configurations may be employed, for example, a diesel engine. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208 by engaging one or more clutches, including forward clutch 210, where the torque converter may be referred to as a component of the transmission. Torque converter 206 includes an impeller 220 that transmits torque to turbine 222 via hydraulic fluid. One or more clutches may be engaged to change mechanical advantage between the engine vehicle wheels 214. Impeller speed may be determined via speed sensor 225, and turbine speed may be determined from speed sensor 226 or from vehicle speed sensor 230. The output of the torque converter may in turn be controlled by torque converter lock-up clutch 212. As such, when torque converter lock-up clutch 212 is fully disengaged, torque converter 206 transmits torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. Although one lock-up clutch 212 is provided, the torque converter 206 may also contain more than one lock-up clutches. The lock-up clutch 212 may be of various types that can allow various states of engagements between the pump impeller 220 and the turbine 222, such as a wet-type friction clutch, by for example providing various degrees of slip between the pump impeller 220 and the turbine 222. The lock-up clutch may be electronically control via an electromechanical actuator, electro-hydraulic actuator, etc.

As described with respect to FIG. 1B, engine 10 may be controlled by controller 12. Controller 12 may be configured to adjust the amount of torque transmitted by the torque converter by adjusting the torque converter lock-up clutch in response to various engine operating conditions, or based on a driver-based engine operation request. The controller 12 may also control the operation of the lock-up clutch 212 through a lock-up clutch actuator (not shown). For example, the controller 12 may sense a vehicle operating condition (e.g., through the various sensors and actuators, such as those described with respect to FIGS. 1A and 1B), calculates a target lock-up clutch engagement pressure, which corresponds to a target engagement state for the pump impeller 220 and the turbine 22, and then sends signals to the lock-up clutch actuator to cause the lock-up clutch 212 to apply the target engagement pressure to the pump impeller 220 and turbine runner 222.

The engagement state between the pump impeller 220 and the turbine 222 may depend on the lock-up clutch engagement pressure applied. For example, if the engagement pressure (PEN) is at or above a threshold value (PA), or PEN≥PA, the pump impeller 220 and turbine 222 become fully engaged, that is they move as an integral part; if the engagement pressure is at or below a threshold value PB, the pump impeller 220 and the turbine 222 become completely disengaged, leaving only a fluid coupling between the pump impeller 220 and the turbine 222; and if the engagement pressure is between threshold values PA and PB the pump impeller 220 and the turbine 222 become partially engaged, allowing some slip between the pump impeller 220 and the turbine runner 222, and the slip decreases with an increase in the engagement pressure.

For example, a slip of 0% occurs when the pump impeller 220 and the turbine 222 are fully engaged and moves as an integral part. A slip of 100% indicates that there is a complete fluid coupling and no mechanical engagement between the pump impeller 220 and the turbine 222. A slip between 0 to 100% indicates that the pump impeller and the turbine runner are partially mechanically engaged and there is some slip between them. As the slip decreases, the engagement between the pump impeller 220 and the turbine 222 increases.

Torque output from the automatic transmission 208 may in turn be relayed to wheels 214 to propel the vehicle. Specifically, automatic transmission 208 may adjust an input driving torque at the input shaft (not shown) responsive to a vehicle traveling condition before transmitting an output driving torque to the wheels.

Further, wheels 214 may be locked by engaging wheel brakes 216. In one example, wheel brakes 216 may be engaged in response to the driver pressing his foot on a brake pedal (not shown). In the similar way, wheels 214 may be unlocked by disengaging wheel brakes 216 in response to the driver releasing his foot from the brake pedal. During an autonomous mode of engine operation, brakes may be engaged or disengaged based on indication from one or more autonomous sensors.

A mechanical oil pump (not shown) may be in fluid communication with automatic transmission 208 to provide hydraulic pressure to engage various clutches, such as forward clutch 210 and/or torque converter lock-up clutch 212. The mechanical oil pump may be operated in accordance with torque converter 206, and may be driven by the rotation of the engine or transmission input shaft, for example. Thus, the hydraulic pressure generated in mechanical oil pump may increase as an engine speed increases, and may decrease as an engine speed decreases.

In one example, torque converter operation may be adjusted based on a detected occupancy level in the vehicle. For example, when the occupancy level is lower, the controller may apply reduced NVH constraints to improve fuel economy as concern for NVH is decreased. Accordingly, the controller may adjust a torque converter slip towards less slip. In some examples, the controller may utilize a look-up table based on reduced NVH constraints to determine a desired torque converter slip and adjust the torque converter actuator to provide the desired slip. For a given engine speed and load, the desired torque converter slip may decrease as the occupancy level decreases. By decreasing the torque converter slip when the occupancy level is lower, fuel economy may be improved by reducing torque loss during conversion while NVH may increase due to less dampening effect. However, concern for NVH may be lower due to the lower occupancy level and torque converter operation may be adjusted for improving fuel economy over NVH. In some examples, torque converter operation may also be adjusted based on an operator selected setting (or mode) for a preference between fuel economy and NVH.

In this way, torque converter operation may be adjusted based on occupancy level to provide greater fuel economy benefits. Additionally, various vehicle operations, such as VDE, EGR, DFSO, idle, etc., may be adjusted based on the number of occupants detected within the vehicle. Details of adjusting the various vehicle operations based on the number of occupants to improve fuel economy will be further elaborated with respect to FIGS. 3-12 below.

Figure 3:
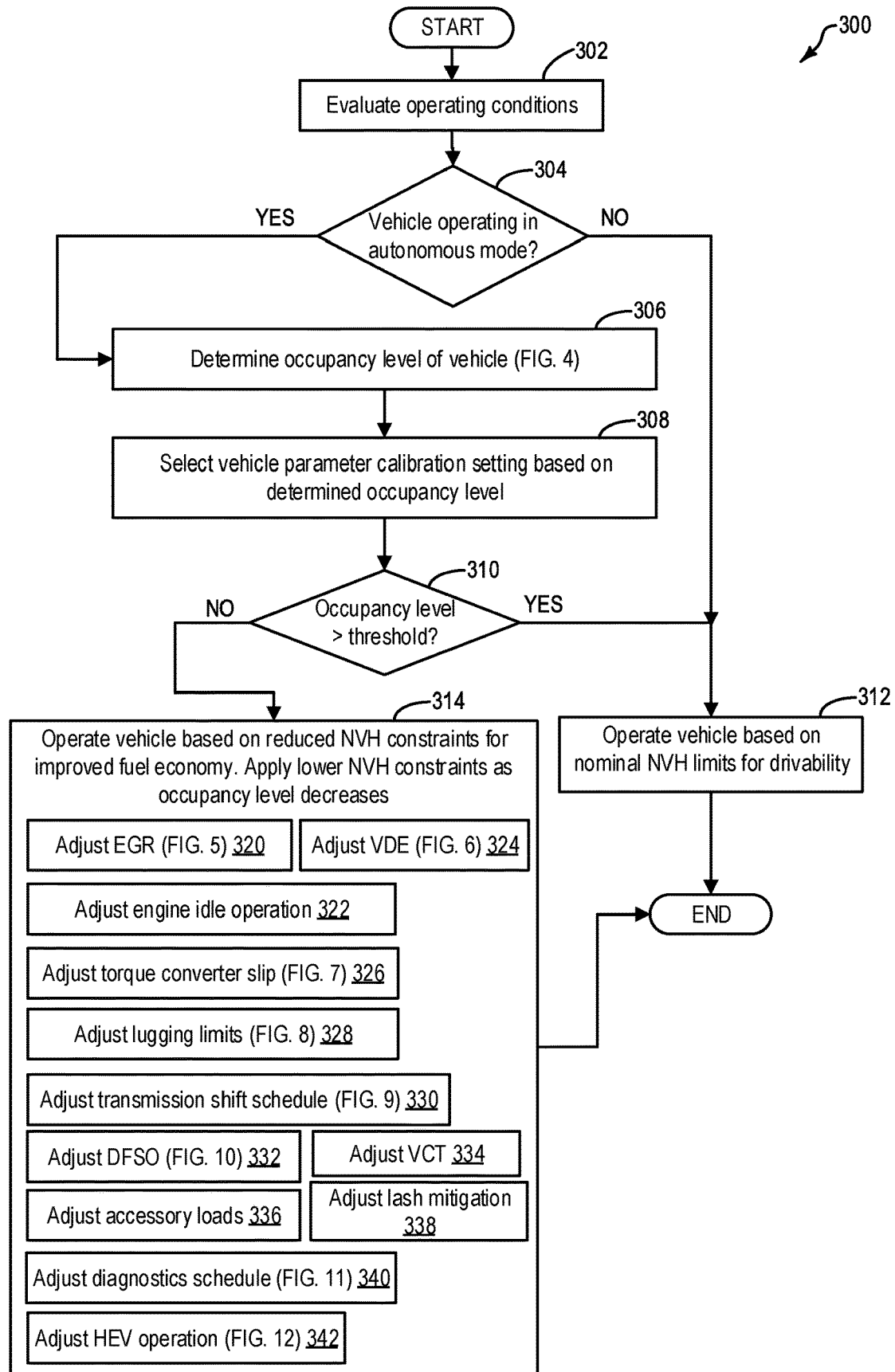
FIG. 3 shows a flowchart illustrating an example method for adjusting powertrain calibration based on a detected occupancy level of a vehicle.

Turning to FIG. 3, a flow chart is shown illustrating an example method 300 for adjusting vehicle operation based on an occupancy level of a vehicle. Specifically, method 300 includes adjusting vehicle operation by lowering NVH constraints to improve fuel economy when the vehicle is operating in an autonomous mode and the occupancy level is lower (e.g., lower than a threshold) in the vehicle. Instructions for carrying out method 300 and other methods included herein may be executed by a controller of the vehicle system, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on a number of occupants, whether the occupant is a passenger or a driver, and if the driver is active or passive in vehicle control. The adjustments enable vehicle operation to be controlled to increase fuel economy while reducing NVH constraints as the occupancy level decreases, according to the methods described below.

Method 300 begins at 302. At 302, method 300 includes evaluating vehicle operating conditions. Vehicle operating conditions may include a mode of vehicle operation (e.g., autonomous, semi-autonomous, or operated by an operator), ambient conditions, engine operating conditions, heating ventilation and air conditioning (HVAC) conditions, and fuel system operating conditions. Engine operating conditions may include engine load, engine speed, mode of engine operation (e.g., VDE or non-VDE), exhaust gas recirculation parameters, amount of throttle valve opening, engine temperature, spark timing, transmission gear ratio, and exhaust catalyst temperature. Fuel system operating conditions may include refueling conditions, fuel tank pressure, fuel tank temperature, fuel pump operating conditions, fuel system diagnostic conditions, and evaporative emissions system conditions. Ambient conditions may include ambient humidity, ambient temperature, and ambient pressure. HVAC conditions may include air conditioning system status, air conditioning clutch voltage, condenser fan speed, and cabin temperature. Evaluating vehicle operating conditions may also include evaluating road condition during vehicle operation. Road conditions may include road roughness, and inclination, as well as weather conditions (e.g., precipitation, snow, etc.). Vehicle operating conditions may be estimated and/or measured by utilizing one or more sensors of the vehicle system, such as sensors described with respect to FIGS. 1A, 1B, and 2.

Next, method 300 proceeds to 304. At 304, method 300 includes determining if the vehicle is operating in an autonomous mode. In one example, the vehicle may be operating in an autonomous mode if an autonomous mode is selected by a vehicle operator, such as via remote communication. If the vehicle is operating in an autonomous mode, the answer at 304 is NO, and method 300 proceeds to 310. At 310, method 300 includes operating the vehicle based on nominal NVH constraints. For example, when the vehicle is not operating in the autonomous mode, a vehicle operator is controlling the operation of the vehicle. Therefore, one or more parameters of vehicle operation may be adjusted such that impact of noise, vibration, and harshness (NVH) experienced by the operator, and any occupants in the vehicle, are reduced and drivability is improved. As such, this may result in the powertrain calibration settings to be biased away from a theoretical ideal setting for fuel economy due to the imposition of NVH constraints. The degree of NVH constraints applied may be at a highest setting when the vehicle is not operating in the autonomous mode.

The one or more parameters of the vehicle operation that are adjusted with NVH constraints applied may include EGR operation. For example, an amount of EGR delivered may be limited based on NVH constraints. In one example, during idle conditions, when nominal NVH constraints are used, EGR may not be delivered (that is desired EGR may be zero) in order to reduce idle roughness when engine is operating at idle speed and load. In another example, when nominal NVH constraints are used, during rough road conditions (that is, when the vehicle is travelling on rough road), EGR may be disabled to reduce NVH and improve drivability. In yet another example, in vehicles equipped with an EGR cooler, when nominal NVH constraints are applied, during cold start conditions, EGR may be disabled for a threshold duration after light-off until a desired EGR cooler temperature is reached. Delaying EGR after catalyst light-off provides reduced NVH and increases drivability.

As another example, idle operation may be adjusted to reduce NVH. For example, when the engine is operating at idle conditions, a VDE mode of operation may be disabled, and an amount of spark retard may be limited based on NVH constraints.

As another example, VDE mode of operation may be adjusted. For example, during VDE conditions, a number of cylinders deactivated may be reduced to reduce NVH. That is, the number of cylinders that may be deactivated in the VDE may be based on nominal NVH constraints for improved drivability.

As yet another example, a torque converter slip rate may be adjusted. For example, when a lock-up clutch is locked (lock-up mode), a direct connection is provided between the engine and transmission, which increases efficiency. However, in the lock-up mode, due to mechanical coupling via the lock-up clutch, drivetrain noise and vibration is experienced by the operator and/or occupants in the vehicle. In order to provide improved drivability, the torque converter may be allowed to slip, thereby increasing fluidic coupling and decreasing mechanical coupling. The fluidic coupling dampens the sensitivity to drivetrain vibration, thereby improving NVH performance. An amount of slip may be based on drivetrain resonance for a given engine speed. Specifically, the amount of slip may be determined based on a torque converter slip schedule or map stored in a memory of a controller. The map may be used to determine the desired torque converter slip that provides desired dampening effect for the current engine load and speed. The controller may then adjust a torque converter actuator to provide the desired slip.

As a further example, a lugging NVH limit may be based on nominal NVH constraints. For example, at lower engine speeds, if a torque converter slip is reduced below a threshold torque converter slip (e.g., 30 rpm or lower), the vehicle would fail to meet the desired NVH target for drivability. Specifically, an NVH mode known as lugging caused by impulsive inputs due to delivering high combustion torques can be induced if too much torque is requested at low engine speeds when the gear ratio is too high. A torque converter may be used to control NVH associated with lugging. Specifically, slipping the torque converter increases damping. As a result, sensitivity of driveline vibrations to engine torque excitation is reduced, which improves NVH. Thus, during lugging conditions, vehicle may be operated with a torque converter slip above a threshold torque converter slip in order to meet desired NVH level and maintain drivability. In other words, torque converter operation is adjusted such that desired NVH levels are maintained during lugging.

As still another example, a transmission shift schedule for improved NVH may be used. For example, Upshift and Downshift decisions may be based on the maximum torque available at any given time to ensure good drivability and good NVH.

As a further example, DFSO operation may be adjusted. Specifically, a transition into and out of DFSO may be adjusted. For example, when DFSO conditions are met, deactivation of fuel injectors to all cylinders may be delayed. Further, in order to improve NVH, activation of fuel injectors may be performed earlier, responsive to brake release and vehicle speed greater than a threshold speed. Further, DFSO may be disabled under low gear operation, and all-wheel drive operation.

As a still further example, operation of a solenoid valve of a HP pump may be adjusted to reduce NVH during low speed engine operation. Furthermore, in some examples, air conditioning compressor clutch cycling may be adjusted for reduced NVH.

Returning to 304, if the vehicle is operating in an autonomous mode, the answer at 304 is YES, and method 300 proceeds to 306. At 306, method 300 includes determining an occupancy level of the vehicle. As elaborated with reference to FIG. 4, determining the occupancy level includes determining a number of occupants in the vehicle, determining if the occupant is a driver or a passenger, and if a driver is present, then determining if the driver is actively involved in vehicle control or not. The occupancy level may be determined based on one or more of a seat pressure sensor, an infra-red sensor, one or more cameras and microphones to identify occupants within the vehicle, etc.

At 308, the method includes selecting vehicle parameter calibration settings based on determined occupancy level. At 310, the selecting includes operating the vehicle based on reduced NVH constraints for improved fuel economy. Therein, progressively lower NVH constraints may be applied, relative to the nominal NVH constraints, as the occupancy level decreases. By implementing reduced NVH constraints for adjusting one or more vehicle operating parameters, an improvement in fuel economy is achieved.

Figure 5:
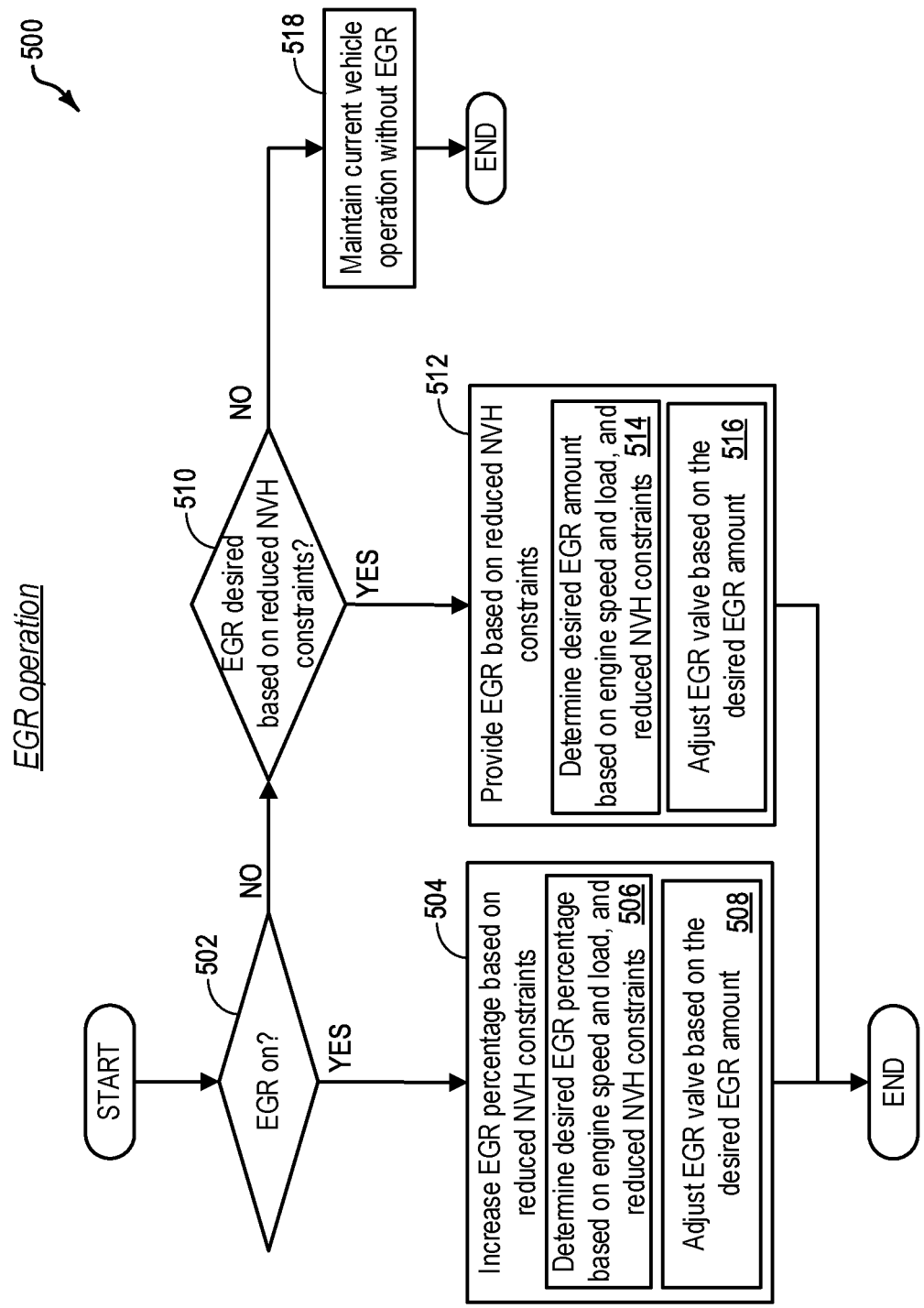
FIG. 5 shows a flowchart illustrating an example method for controlling exhaust gas recirculation settings of the vehicle with reduced NVH constraints at lower vehicle occupancy levels.

The one or more parameters of the vehicle operation that are adjusted with reduced NVH constraints applied may include, at 320, EGR operation, as detailed at FIG. 5. Further, idle operation may be adjusted at 322. For example, the engine idle speed may be lowered to below a nominal idle speed limit that is applied when the vehicle is not operated in the autonomous mode. As an example, when the vehicle occupancy level is higher (e.g., higher than a threshold, such as may occur when the vehicle includes an active driver and a passenger), an engine idle speed of 400 rpm may be applied. In comparison, when the vehicle includes only a passive driver, an engine idle speed of lower than 400 rpm may be applied. Further still, when the vehicle only includes a passenger (and no driver), an engine idle speed further lower of 400 rpm may be applied.

At 324, VDE operation may be adjusted. Details of adjusting VDE operation for improved fuel economy by reducing NVH constraints is elaborated at FIGS. 6A and 6B. At 326, a torque converter slip rate may be adjusted. Details of adjusting torque converter operation for improved fuel economy by reducing NVH constraints is elaborated at FIG. 7. Further, at 328, lugging limits may be adjusted. Details of adjusting lugging limits for improved fuel economy by reducing NVH constraints is elaborated at FIG. 8. Further, at 330, transmission shifting may be adjusted. Details of adjusting transmission shift schedule for improved fuel economy by reducing NVH constraints are elaborated at FIG. 9. Further, at 332, method 300 includes adjusting DFSO operation by reducing NVH constraints, as elaborated at FIG. 10.

At 334, the method includes adjusting a variable cam timing (VCT) based on the reduced NVH constraints. For example, when the vehicle occupancy level is lower (e.g., lower than a threshold), VCT may be positioned to track maximum fuel efficiency.

At 336, the method includes adjusting accessory loads based on the reduced NVH constraints. For example, HVAC may be set to a higher temperature set point to reduce the accessory load applied on the engine. In one example, as the occupancy level of the vehicle decreases, the temperature set point may be raised relative to a nominal setting, and the accessory load may also correspondingly decrease.

At 338, the method includes adjusting lash mitigation settings based on the reduced NVH constraints. For example, spark retard usage to manage driveline lash/shuffle may be reduced. In one example, as the occupancy level of the vehicle decreases, the amount of spark retard applied for lash mitigation may be reduced. As a result, when the occupancy level is lowest, lash may not be mitigated since the associated NVH may not be objectionable to vehicle occupants.

At 340, the method includes adjusting the schedule for on-board diagnostics, such as those used for knock, clutch slip, DPF regeneration, etc., based on the reduced NVH constraints. In one example, as elaborated at FIG. 11, when the occupancy level is lower, the vehicle controller may intrusively run diagnostic routines and/or adaptive control strategies for knock control, clutch slip, DPF regeneration, etc. As such, these may be diagnostic routines that would have otherwise not been performed due to NVH that is objectionable to the vehicle operator. In still other examples, entry and exit conditions for the OBD routines may be relaxed when the occupancy level is lower.

At 342, the method includes adjusting HEV operation settings based on the reduced NVH constraints. These adjustments are elaborated at FIG. 12. For example, a more aggressive approach may be applied for charging a system battery when operating the hybrid vehicle in an engine mode so that the vehicle can be operated in an electric mode for a longer duration or a longer distance during a later part of the drive cycle.

In this way, by adjusting vehicle calibration to bias fuel economy over NVH constraints during autonomous vehicle operating conditions when the vehicle's occupancy level is lower, fuel economy may be improved.

In some applications, transmission clutch slippage during shifting also may be used and controlled based on the number of occupants. For example, transmission clutch slippage during gear shifts may be used to provide an occupant with a sensation of smoother gear shifts. When an occupant is not present, transmission clutch slippage may be decreased to improve fuel economy. Transmission clutch shifting during gear shifts may be used in place of, or in addition to, adjusting the torque converter lock-up clutch during shifting described with reference to FIG. 9, step 908.

In still further applications, vehicles having stop/start capability may be controlled during mode transitions between stop and start dependent upon the occupancy level of the vehicle. When the occupancy level is lower, a more aggressive engine stopping may be programmed for improved fuel economy at the cost of more abrupt stops and starts. For example, the vehicle speed at which the engine is shut-off when stopping may be increased when an occupant is not present for improved fuel economy. Engine stop (also referred to as engine shut-off) may be performed by deactivating one or more of fuel injection and spark, for example.

Figure 4:
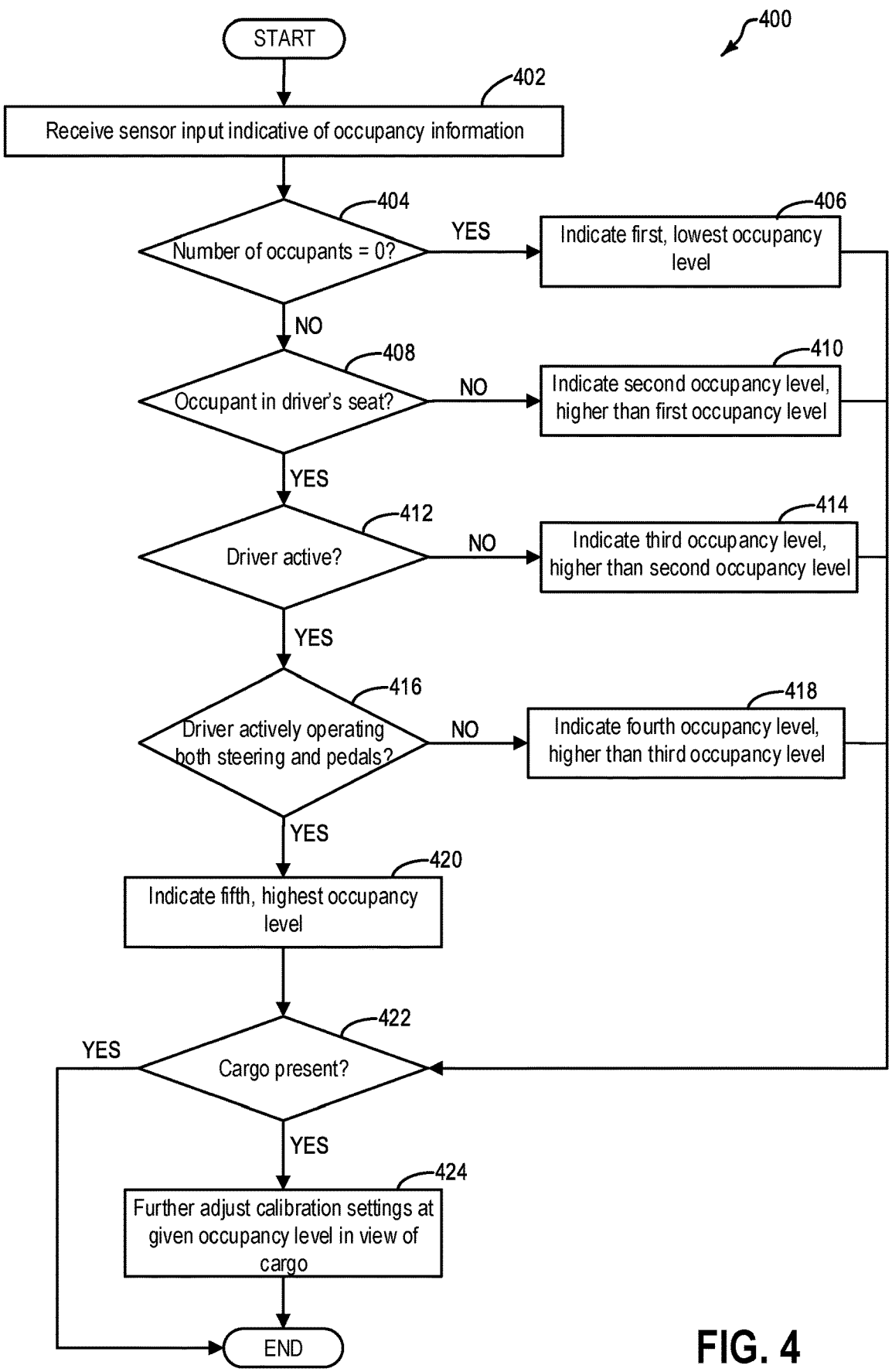
FIG. 4 shows a flowchart illustrating an example method for determining an occupancy level of a vehicle.

Turning to FIG. 4, an example method 400 for determining an occupancy level of the vehicle is shown. The method of FIG. 4 may be performed as part of the method of FIG. 3, such as at 306. Method 500 will be described herein with reference to the components and systems depicted in FIGS. 1A, 1B, and 2, though it should be understood that the method may be applied to other systems without departing from the scope of this disclosure.

At 402, the method includes receiving sensor input indicative of occupancy information. This includes input from sensors coupled to vehicle seats, such as seat pressure sensors, occupancy sensors, and capacitive touch sensors. Input may also be received from cameras and microphones coupled to the vehicle cabin. Input may also be received from infra-red based eye and face sensors. The sensor input may be indicative of a number of occupants as well as their location within the vehicle cabin. For example, the sensor input may indicate if an occupant is present, and if so, if the occupant is a passenger or a driver.

Further still, data may be received from engine system components and engine actuators that are actuated based on input from an operator. For example, input may be received from steering and braking system components. These may include a steering wheel sensor, a brake pedal sensor, an accelerator pedal sensor, etc. The input may indicate if a driver, when present, is actively involved in vehicle control. In some examples, while a vehicle is in an autonomous mode, a vehicle driver may sit in the driver's seat but let the vehicle controller control all vehicle settings. Alternatively, the vehicle driver may control one or more of the steering and pedals.

If an occupant is present in the vehicle, and further based on their seating location and their level of driving activity, the NVH they experience during vehicle propulsion may vary. This is because their seating location and activity level affects the vehicle surfaces they are in contact with. NVH is transmitted through several vehicle surfaces, such as through the seat, the steering wheel, the pedals, sound in the cabin, etc. Thus, if an occupant is present in the vehicle in a passenger seat (e.g., in the rear of the vehicle, but not in the driver seat in the front of the vehicle), the NVH they experience may be limited to NVH transmitted through the cabin and seats. In comparison, if the occupant is a driver, they may experience more NVH due to being in the front seat, and additional NVH if they actively interacting with a steering control and/or pedals.

It will be appreciated that in addition to sensor input, occupancy information may also be inferred based on vehicle mass estimates, a priori modus operandi information, such as received via cloud dispatch or V2X communications, etc.

At 404, it may be determined, based on sensor input, if any occupants are present. If there are no occupants, then at 406, a first, lowest occupancy level may be indicated. If any occupant is present, then the method moves to 408 where it is determined, based on the sensor input, if the occupant (or one of the occupants) is in a driver's seat. If not, then at 410, based on all the occupants being passengers, a second occupancy level, higher than the first occupancy level, may be indicated.

If an occupant is present in the driver's seat, then at 412, it may be determined if the driver is active. For example, it may be determined if the driver is actively interacting with the steering and/or braking controls. As one example, the vehicle may contain a passenger (but not necessarily a driver), who may be seated in the "driver's seat" but who is not currently driving the vehicle, even if they were driving at another point in the given drive cycle. In one example, the occupant may have actively driven from one point to a highway, and then enabled the autonomous system to take over the driving controls once the vehicle was on the highway. If the occupant in the driver's seat is not currently driving the vehicle, then at 414, a third occupancy level, higher than each of the first and second occupancy levels, may be indicated.

If the driver is active, then at 416, it may be determined if the driver is actively operating both steering and pedal controls. In one example, the vehicle occupant may be a driver operating steering controls but not pedal controls. In another example, the vehicle occupant may be a driver operating both steering controls and pedal controls. If the driver is operating only one of the steering and pedal controls, then at 418, a fourth occupancy level, higher than each of the first, second, and third occupancy levels, may be indicated. If the driver is operating both the steering and pedal controls, then at 420, a fifth, highest occupancy level may be indicated. In this way, based on the presence of vehicle occupants, and further based on their seating position within the vehicle cabin, and their inferred level of interaction with vehicle controls and actuators, an occupancy level of the vehicle may be determined. By categorizing the vehicle occupancy as one of multiple possible occupancy levels, powertrain calibration may be accordingly adjusted based on the occupancy level to enable a wide range of settings that vary in their bias between NVH and fuel economy. As a result, a better balance between engine efficiency and occupant comfort can be provided.

From each of 406, 410, 414, 418, and 420, the method moves to 422 to determine if there is cargo present in the vehicle. For example, based on sensors in the car truck, it may be determined if cargo is present. Alternatively, it may be determined based on sensor input if cargo is present on a car rooftop, or in a trailer being towed by the vehicle. If yes, then at 424, the method includes further adjusting powertrain calibration settings at the given occupancy level in view of the presence of cargo.

Turning now to FIG. 5, an example method 500 for adjusting EGR operation during autonomous vehicle operation with reduced occupancy level is shown. Method 500 may be performed in coordination with method 300 at FIG. 3. Method 500 will be described herein with reference to the components and systems depicted in FIGS. 1A, 1B, and 2, though it should be understood that the method may be applied to other systems without departing from the scope of this disclosure. Instructions for carrying out method 500 may be executed by a controller, such as controller 12 at FIGS. 1A, 1B, and 2, based on instructions stored in non-transitory memory of the controller, and in conjunction with signals received from sensors of the vehicle system, such as the sensors described above with reference to FIGS. 1A, 1B, and 2. The controller may employ actuators of the vehicle system, such as the actuators described with reference to FIGS. 1A, 1B, and 2, to adjust vehicle operation based on number of occupants. In particular, the controller may adjust exhaust gas recirculation operation by adjusting position of an EGR valve, such as EGR valve 144 at FIG. 1B, via an actuator of the valve to increase fuel economy while reducing NVH constraints when a lower occupancy level is detected, according to the method 500 described below.

Method 500 begins at 502. At 502, method 500 includes determining if engine is operating with exhaust gas recirculation enabled. For example, it may be determined that exhaust gas recirculation is enabled based on a position of the exhaust gas recirculation (EGR) valve. For example, an EGR valve position sensor may provide an indication of the EGR valve position to the controller. If the EGR valve is closed, it may be determined that the EGR is not enabled, and method 500 proceeds to 510. If the EGR valve is not closed, it may be determined that the EGR is being supplied to the engine, and method 500 proceeds to 504.

At 504, method 500 includes increasing EGR supplied to the engine based on reduced NVH constraints corresponding to the current occupancy level of the vehicle. Increasing EGR may include, at 506, determining a desired EGR percentage of intake air based on engine speed, load, and reduced NVH constraints for the current occupancy level, the NVH constraints reduced further from a nominal level as the occupancy level decreases (from the fifth highest towards the first lowest occupancy level). Specifically, the desired EGR percentage of intake air may be higher when NVH constraints are lower than when NVH constraints are higher. Thus, the desired EGR dilution is highest for a given engine speed and load when the occupancy level is at the first occupancy level, and the EGR dilution reduces progressively as the occupancy level increases, the EGR dilution being lowest for the given engine speed and load when the occupancy level is at the fifth level.

In one example, a look up table mapping engine speed and load conditions to desired EGR percentage may be used to determine a base desired EGR percentage, the look up table further including a factor with which to multiple the desired EGR percentage that is indicative of a degree of NVH constraint reduction to be applied based on the occupancy level. For example, the controller may determine the desired EGR percentage based on a calculation using the look-up table with the input being engine speed and load and occupancy level, and the output being the desired EGR percentage taking into account the corresponding level of NVH constraint reduction.

Further, based on the desired EGR percentage and mass air flow (MAF), a desired EGR flow may be calculated. The EGR valve is then adjusted, at 508, based on the desired EGR flow to provide the desired EGR percentage of intake air. The EGR valve may be adjusted by a valve actuator based on commands from the controller. In one example, when EGR is provided as a fixed percentage of intake air within a speed-load range (e.g. low to mid speed load range), the fixed percentage of intake air may be higher when NVH constraints are reduced than when nominal NVH constraints are used. In one example, when variable EGR is provided based on engine speed and load, the desired EGR percentage for a given speed and load may increase as NVH constraints are reduced relative to when nominal NVH constraints are applied. After supplying the desired EGR, method 500 may return.

Returning to 502, if it is confirmed that EGR is not on, method 500 proceeds to 510. At 510, method 500 includes determining if EGR is desired based on reduced NVH constraints. For example, during idle conditions, when nominal NVH constraints are used, the EGR may not be delivered (that is desired EGR may be zero) in order to reduce idle roughness when engine is operating at idle speed and load. However, as the occupancy level of the vehicle decreases, and the vehicle is driven autonomously, NVH constraints may be reduced and EGR may be supplied to improve fuel economy during idle conditions. The EGR percentage may not exceed a first threshold, where the first threshold is based on an amount of EGR that can cause engine stalling under idle conditions. Thus, the amount of EGR supplied during idle conditions may be greater than zero but less than the first threshold such that fuel economy and emission benefits may be realized without causing engine stalling or severe combustion instability. In another example, when nominal NVH constraints are used, during rough road conditions (that is, when the vehicle is traveling on rough road), EGR may be disabled to reduce NVH and improve drivability. However, as the occupancy level decreases, the NVH constraints may be relaxed. Accordingly, when the vehicle is travelling on rough road, EGR may not be disabled and a desired EGR percentage may be increased as the occupancy level decreases for improved fuel economy and emissions. The desired EGR percentage may be based on engine speed and load, and reduced NVH constraints. In yet another example, in vehicles equipped with an EGR cooler, when nominal NVH constraints are applied, during cold start conditions, EGR may be disabled for a threshold duration after light-off until a desired EGR cooler temperature is reached. Delaying EGR after catalyst light-off provides reduced NVH and increases drivability. However, as the occupancy level decreases, the delay in providing EGR may be reduced. As an example, when the occupancy level is the lowest, the desired EGR may be provided without any delay after catalyst light-off temperature is reached in order to improve fuel economy.

At 510, if it is determined that EGR is desired, method 500 proceeds to 512. At 512, method 500 includes delivering EGR, the EGR percentage determined based on reduced NVH constraints corresponding the determined occupancy level in addition to engine speed and load conditions. Accordingly, delivering EGR includes, at 514, determining a desired EGR percentage based on engine speed and load, and the occupancy level. Based on the desired EGR percentage and mass air flow (MAF), a desired EGR flow may be calculated. The EGR valve is then adjusted, at 516, based on the desired EGR flow to provide the desired EGR percentage of intake air.

Returning to 510, if it is judged that EGR is not desired, method 500 proceeds to 518. For example, during cold start conditions, for expediting catalyst light-off, it may be desirable to stop EGR flow until a threshold temperature is reached. Under such conditions, when the exhaust catalyst temperature is below the light-off temperature, EGR may not be provided and vehicle operation may be maintained without EGR until conditions for EGR delivery based on engine speed and load, and reduced NVH constraints are satisfied (e.g. until exhaust catalyst temperature measured based on an indication from an exhaust catalyst temperature sensor reaches a threshold light-off temperature).

In this way, for a given engine speed and load after an engine cold start, the EGR flow may be increased from a nominal level as the occupancy level of the vehicle decreases, while maintaining the EGR flow above a threshold based on combustion stability limits (or misfire limits) of the engine.

Figures 6A, 6B:
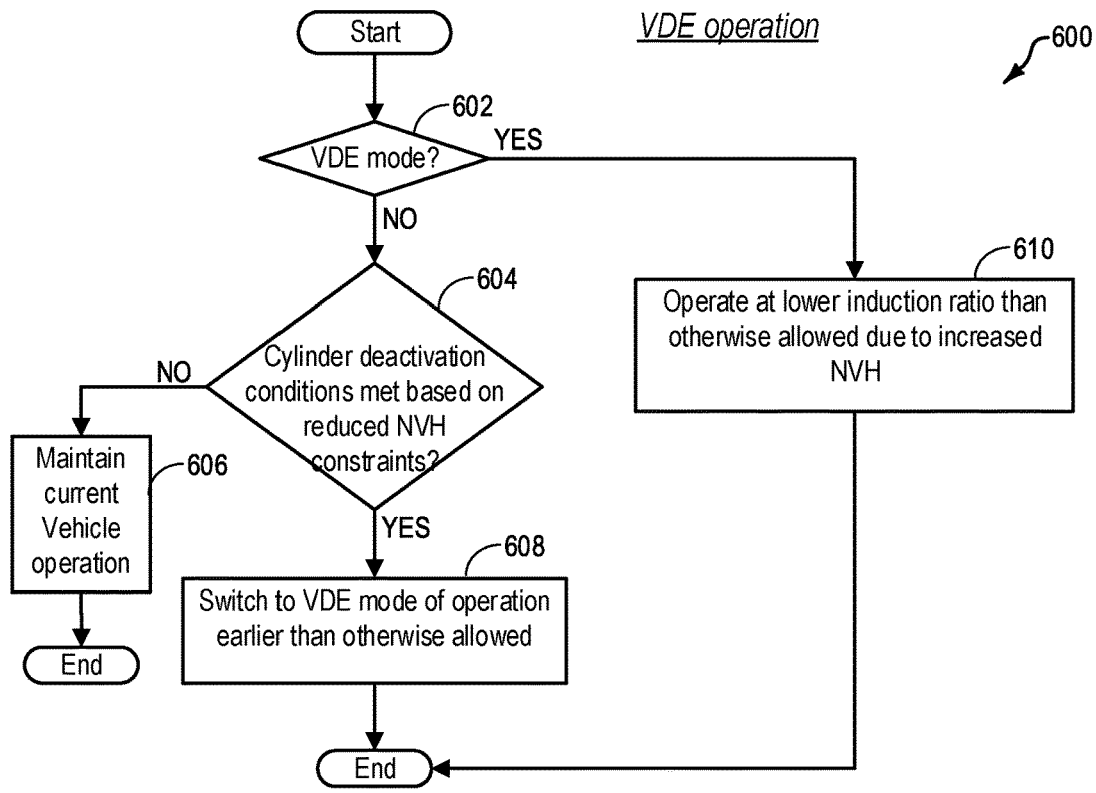
FIG. 6A shows a flowchart illustrating an example method for controlling variable displacement engine (VDE) operation of the vehicle with reduced NVH constraints at lower vehicle occupancy levels.
FIG. 6B shows a graph illustrating an example operating range of VDE with reduced NVH constraints at lower vehicle occupancy levels.

Turning to FIG. 6A, an example method 600 is shown for adjusting a VDE mode of engine operation based on an occupancy level of the vehicle. Specifically, an operating range of the VDE mode may be expanded as the occupancy level decreases to improve fuel economy. Method 600 may be performed in coordination with method 300 at FIG. 3. Method 600 will be described herein with reference to the components and systems depicted in FIGS. 1A, 1B, and 2, though it should be understood that the method may be applied to other systems without departing from the scope of this disclosure. In particular, the controller may adjust VDE operation based on reduced NVH constraints by adjusting one or more of an intake valve, an exhaust valve, spark timing, and fuel injection, to deactivate one or more engine cylinders during VDE mode, via one or more of an intake valve actuator, an exhaust valve actuator, a spark plug actuator, and a fuel injector actuator, to increase fuel economy while compromising NVH as the occupancy level decreases, according to the method 600 described below.

Method 600 begins at 602. At 602, method 600 includes judging if the vehicle is already operating in a VDE mode. For example, the vehicle may be confirmed to be operating in the VDE mode if a number of cylinders are deactivated while a remaining number of cylinders are active. Deactivation of the cylinders may be determined based on the states of one or more of intake valve, exhaust valve, fuel injectors, and spark plug. If the answer at 602 is YES, the vehicle is operating in the VDE mode, and method 600 proceeds to 612. At 612, responsive to the vehicle being already in the VDE mode, the method includes transitioning to a lower induction ratio than otherwise allowed, the lower induction ratio selected based on the occupancy level.

If the answer at 602 is NO, the vehicle is not operating in the VDE mode, and method 600 then proceeds to 604. At 604, method 600 includes determining if cylinder deactivation conditions are met based on reduced NVH constraints. For example, the vehicle and/or engine operating conditions may be measured and/or estimated. Further, reduced NVH constraints may be applied based on the occupancy level to determine if it is possible to operate the vehicle in the VDE mode. For example, at near-idle or idle speed conditions, when nominal NVH constraints are applied, for smoother drive and better feel, VDE operation may be disabled. This is because the associated NVH may be objectionable to a vehicle occupant. However, operating the vehicle in the VDE mode during idle or near-idle conditions may improve fuel economy. Therefore, as the occupancy level of the vehicle decreases while the vehicle is operating in an autonomous mode, NVH constraints may be reduced and engine operation may be biased towards favoring fuel economy over NVH. In one example, based on the occupancy level, engine speed and load thresholds within which VDE operation may be performed may be adjusted. Specifically, as the occupancy level decreases, VDE operation may be enabled at lower engine speeds and loads in view of the reduced NVH constraints as compared to the range where VDE operation is enabled with nominal NVH constraints. The controller may then determine, based on the adjusted threshold, if VDE operation is desired after applying reduced NVH constraints. If yes, at 608, the engine may switch to a VDE mode of operation earlier than otherwise allowed. In addition, at 610, the engine may operate at a lower induction ratio than otherwise allowed.

In a further example, a number of gears or gear ratios during which VDE operation may be enabled can be varied when operating with reduced NVH constraints. Typically, when nominal NVH constraints are employed, operation in VDE mode may be disabled during vehicle operation in a first and/or second transmission gear. However, when NVH constraints are reduced due to lower occupancy levels, depending on torque requirements, VDE mode operation in the first and/or second gear may not be disabled. Thus, if torque requirements are satisfied, the engine may be allowed to operate in the VDE mode when the current transmission ratio is in the first gear and/or the second gear in order to improve fuel economy.

Switching to VDE mode of operation, and operating the engine in the VDE mode includes, deactivating a number of cylinders by deactivating one or more of intake valves, exhaust valves, spark, and fuel injection. In this way, a VDE operation boundary may be expanded to improve fuel economy while compromising NVH when the occupancy level of the vehicle is lower, such as when there are no occupants, or when the occupant is not an active driver.

Returning to 604, if cylinder deactivation conditions are not met, then at 606, the method includes maintaining current vehicle operation.

While the present examples illustrate controlling VDE mode of operation independent of other operations, it will be appreciated that during conditions when reduced NVH constraints are employed, VDE operation may be controlled in coordination with one or more other vehicle operations, such as torque converter operation, EGR operation etc.

FIG. 6B illustrates a graph showing operating range of VDE based on different NVH constraints. The VDE operation is plotted against throttle opening and engine speed.

Rectangular boundary 652 indicates an example VDE operating range when nominal NVH constraints are applied. For example, when an active driver is present, or the vehicle is not operating in an autonomous mode, nominal NVH constraints may be applied, and VDE operation may be restricted to mid-range speeds, at low and/or moderate loads where an induction ratio selection biases NVH over fuel economy.

Rectangular boundary 654 indicates an example operating range when NVH constraints are not applied, such as may occur when the occupancy level of the vehicle is lowest. This may occur, for example, when no occupants are present. As the occupancy level goes from the highest level to the lowest level, such as may occur when the vehicle gets an occupant, or when an occupant moves from a passenger seat/role to a driver seat/role, the VDE operating range is changed from rectangular boundary 652 to rectangular boundary 654. Thus, as the reduced NVH constraints are applied at the decreasing occupancy level, VDE operation may be expanded to range more than nominal NVH constraints. In particular, VDE operation is extended to lower engine speeds and higher engine loads than when NVH is nominally constrained.

Figure 7A:
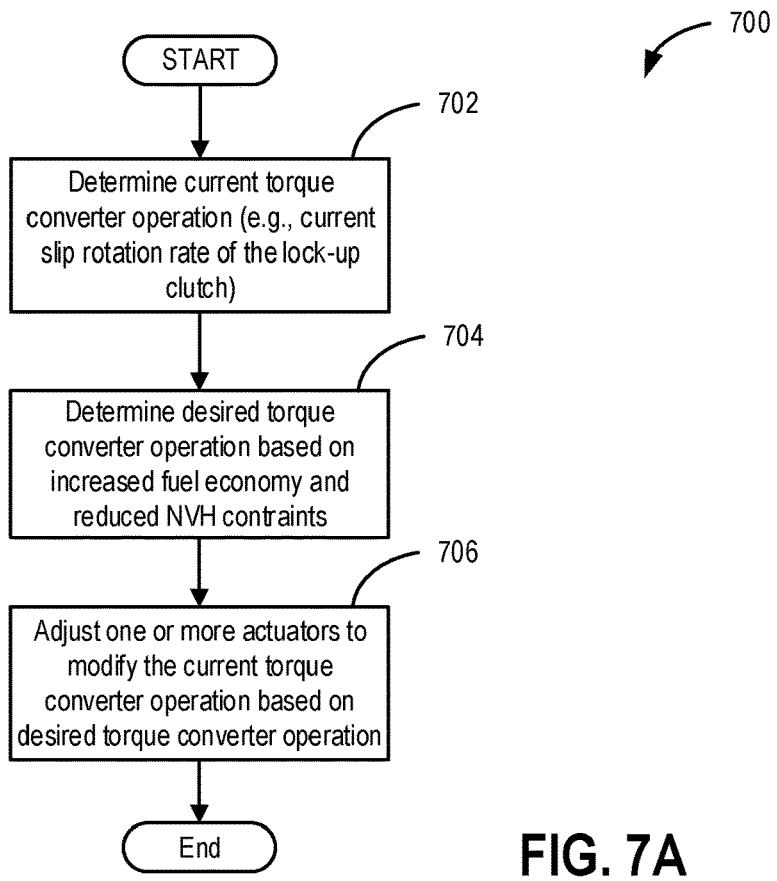
FIG. 7A shows a flowchart illustrating an example method for controlling torque converter operation of the vehicle with reduced NVH constraints at lower vehicle occupancy levels.

Turning now to FIG. 7A, a flow chart illustrating an example method 700 for adjusting torque converter operation based on occupancy level to bias towards increased fuel economy while compromising drivability is shown. Method 700 may be performed in coordination with method 300 at FIG. 3. Method 700 will be described herein with reference to the components and systems depicted in FIGS. 1A, 1B, and 2, though it should be understood that the method may be applied to other systems without departing from the scope of this disclosure. In particular, the controller may adjust operation of a torque converter, such as torque converter 206 at FIG. 2, based on reduced NVH constraints via a torque converter actuator to increase fuel economy while compromising NVH as occupancy level decreases, according to method 700 described below.

Method 700 begins at 702. At 702, method 700 includes determining current torque converter operation. For example, at 702, determining current torque converter operation includes determining a current slip rotation rate of the lock-up clutch. The current slip rotation rate may be determined based on one or more of an impeller speed of the torque converter, a turbine speed of the torque converter, and a duty cycle of a lock-up clutch solenoid.

Figure 7B:
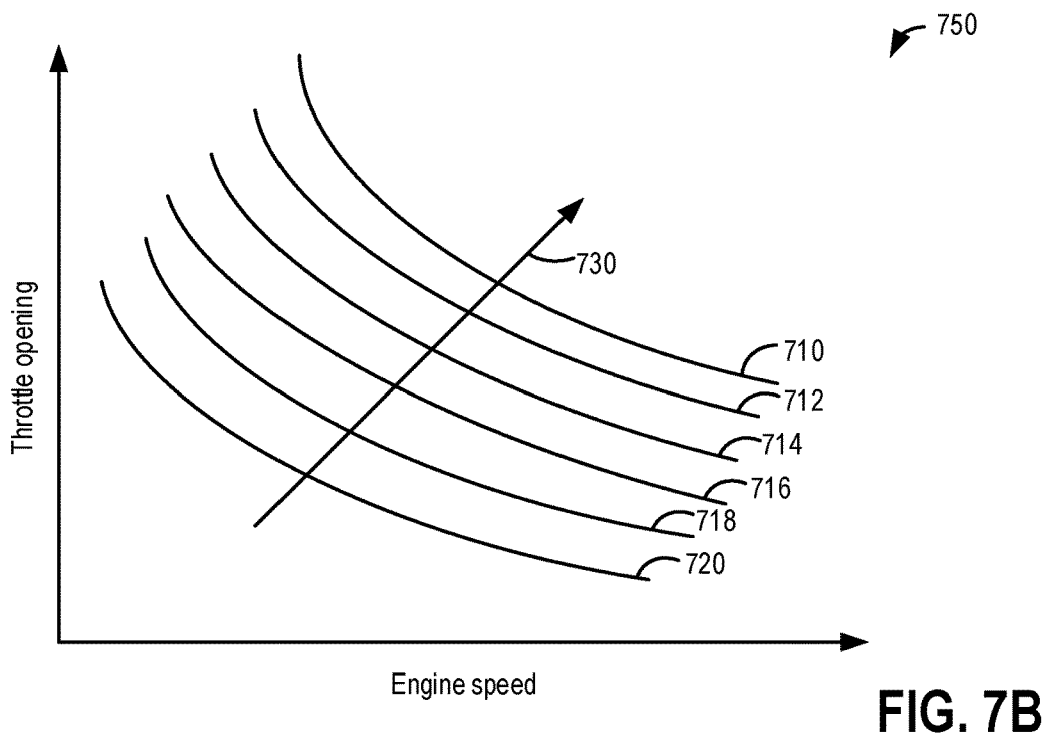
FIG. 7B shows a graph illustrating an example adjustment of a torque converter slip schedule with reduced NVH constraints at lower vehicle occupancy levels.

Upon determining the current slip rotation rate, method 700 proceeds to 704. At 704, method 700 includes determining a desired torque converter operation. For example, at 704, determining the desired torque converter operation includes shifting to a map for controlling torque converter operation that corresponds to the occupancy level of the vehicle. The map may include a torque converter schedule for an operational range of speed and load that favors fuel economy over NVH (that is, drivability), the operational range specific for the corresponding occupancy level. Thus, for a given engine speed and load, the desired torque converter slip rotation rate may decrease as the occupancy level decreases, the decreased slip rotation rate favoring fuel economy over NVH as the occupancy level decreases. The map may be stored in the memory of the controller, and may be utilized for determining the desired slip rotation rate in response to the controller determining the occupancy level of the vehicle. An example torque converter slip schedule or map is shown in FIG. 7B. Specifically, FIG. 7B illustrates directionality of shift in the torque converter slip map when zero occupants are present in the vehicle. Thus, the map that corresponds to zero occupants in the vehicle may be shifted as indicated in FIG. 7B.

In the example map illustrated in FIG. 7B, torque converter slip is mapped against throttle opening and engine speed. Line 710 represents 100% desired slip for the torque converter while line 720 represents 0% desired slip for the torque converter. The desired slip is 0% when engine operation falls on line 720 and torque converter is in a locked state. The desired slip is 100% when engine operation falls on line 710 and the torque converter is in an unlocked state. However, between lines 710 and 720, torque converter may be in a partially locked state. For example, lines 712, 714, 716, and 718 may represent 80%, 60%, 40% and 20% slip respectively. In the partially locked state, the torque converter may be commanded to achieve the desired slip based on engine speed and load conditions. Thus, when moving from line 710 to line 720, the degree of slip increases.

The torque converter map may be adjusted based on an occupancy level of the vehicle. For example, when there are multiple occupants in the vehicle, or when the vehicle is not being operated in an autonomous mode, the torque converter map may be adjusted towards line 710 such that nominal NVH constraints are applied, and NVH and drivability is favored over fuel economy. During this time, the vehicle is adjusted towards more slip. In comparison, when there are fewer occupants in the vehicle while the vehicle is being operated in an autonomous mode, such as when there are no occupants, or when the occupant is a passenger or a passive driver, the torque converter map may be adjusted towards line 720 such that reduced NVH constraints are applied, and fuel economy is favored over NVH and drivability. During this time, the vehicle is adjusted towards less slip. The decrease in slip may favor fuel economy by decreasing torque loss during torque conversion. However, decrease in slip decreases fluidic coupling, which lessens the dampening effect of torque fluctuations. As a result, drivability may be decreased. However, when vehicle occupancy level is lower, concern for drivability may be compromised for fuel economy improvement.

The shifting of the torque converter map based on occupancy level may be performed based on NVH tolerance limits. Specifically, the NVH tolerance limits may be increased when the occupancy level is lower. Therefore, a degree of shift towards less slip may be based on increase in the NVH tolerance limits. In this way, for a given engine speed and load, the desired slip rotation rate may be lower when the occupancy level is lower than a slip rotation rate when the occupancy level is higher.

Returning to FIG. 7A, upon determining the desired slip rotation rate at 704, method 700 proceeds to 706. At 706, method 700 includes adjusting one or more actuators to modify current torque converter operation based on the desired torque converter operation. For example, responsive to a lower desired degree of slip at a lower occupancy level, the controller may send signals to a lock-up clutch actuator to decrease the slip of the lock-up clutch such that a target engagement state (and hence desired slip) of the lock-up clutch is achieved. The routine then ends.

In some examples, method 700 may be performed in response to an occupant-selected mode wherein the occupant chooses to operate the vehicle for increased fuel economy while compromising drivability. Thus, the lock-up clutch operation may be modified based on an occupant-selected setting. Specifically, the controller may modify the lock-up clutch operation based on the occupant selected setting received from a vehicle interface. For example, when an occupant selects a setting that favors improved fuel economy over NVH, the controller may decrease the desired slip of the torque converter. The desired slip may be determined based on a map that is adjusted towards less slip when occupant favors fuel economy. On the other hand, when the occupant selects a setting that favors improved NVH, the controller may increase the desired slip of the torque converter. In this case, the desired slip may be determined based on a map that is adjusted towards more slip when occupant favors drivability.

Figure 8A:
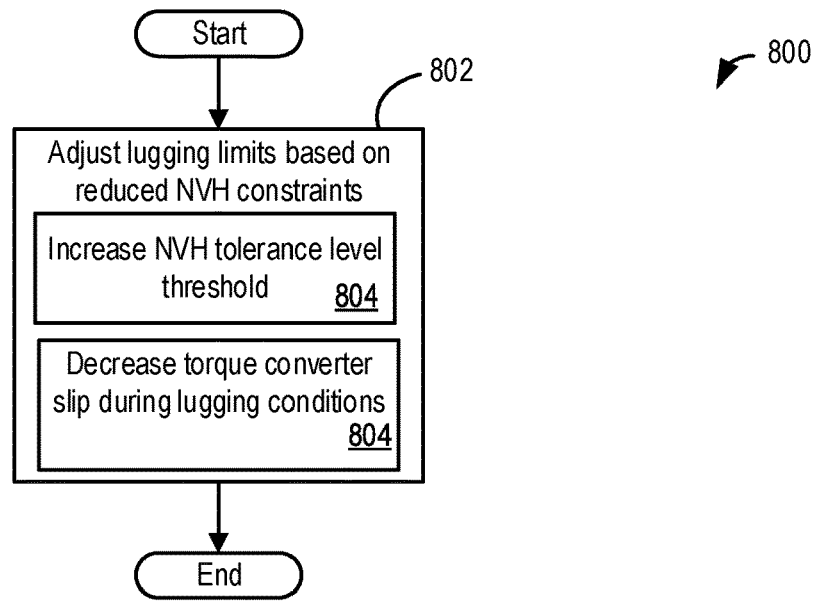
FIG. 8A shows a flowchart illustrating an example method for controlling noise vibration and harshness (NVH) of the vehicle during lugging conditions with reduced NVH constraints at lower vehicle occupancy levels.
Figure 8B:
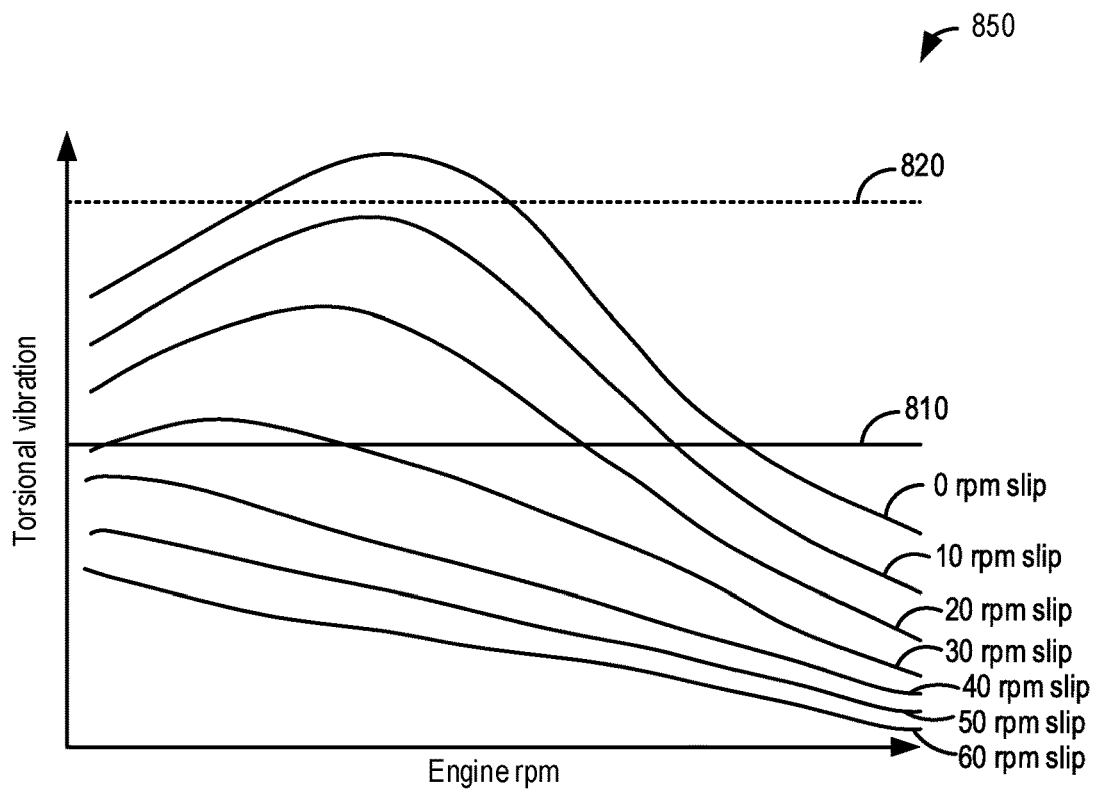
FIG. 8B shows a graph illustrating an example adjustment of lugging NVH thresholds based on vehicle occupancy levels.

Turning to FIG. 8A, an example method 800 for adjusting lugging limits of the engine based on occupancy level is shown. Lugging may be referred to a condition that occurs when the vehicle is operating in high gear with a lower engine speed (e.g., below 2000 rpm). When vehicle acceleration is desired under these conditions, the engine may generate less torque and hence, may struggle to give the desired motion to the vehicle. Thus, the acceleration is low. Due to high load and low engine speeds, firing frequency is low which causes driveline disturbances. Such driveline vibrations may be experienced by the vehicle occupants as one or more of seat track vibration, steering wheel vibration, and interior cabin boom sound. Typically, NVH due to lugging may be controlled through the torque converter, which transmits and amplifies torque from the engine to the transmission using fluid coupling. For example, torque converter slip may be increased during lugging conditions in order to dampen the effect of vibrations produced during lugging. In this way, drivability is improved. However, increasing torque converter slip decreases fuel economy due to fluid coupling and clutch friction. Therefore, as the occupancy level decreases, NVH due to lugging may be better tolerated in order to increase fuel economy. Method 800 may be performed in coordination with method 300 at FIG. 3. Method 800 will be described herein with reference to the components and systems depicted in FIGS. 1A, 1B, and 2, though it should be understood that the method may be applied to other systems without departing from the scope of this disclosure. The controller may employ actuators of the vehicle system, such as the actuators described with reference to FIGS. 1A, 1B, and 2, to adjust vehicle operation based on number of occupants. In particular, the controller may adjust torque converter operation based on reduced NVH constraints via a torque converter actuator to increase fuel economy while compromising NVH based on occupancy level, according to the method 800 described below.

Method 800 begins at 802. At 802, method 800 includes adjusting lugging limits, specifically, lugging NVH tolerance limits, based on reduced NVH constraints. Adjusting lugging limits includes, at 804, increasing an NVH tolerance threshold as the occupancy level decreases. Adjusting lugging limits further includes, at 806, decreasing torque converter slip during lugging conditions as the occupancy level decreases. An example map illustrating torsional vibration at a given transmission output over engine rpm at various slip rpm is shown at map 850 in FIG. 8B. Line 810 indicates lugging limit corresponding to nominal NVH constraints, and line 820 indicates an adjusted lugging limit corresponding to reduced NVH constraints. Typically, when the occupancy level is higher such as when the vehicle includes an active driver or multiple passengers, or when the vehicle is not operated in the autonomous mode, the lugging limit may be set as indicated by line 810. During such conditions, at lower engine speeds, torque converter slip of 30 rpm or lower would fail to meet the desired NVH target. Thus, vehicle may not be operated with a torque converter slip of 30 or less in order to meet desired NVH level and maintain drivability. In other words, torque converter operation is adjusted such that desired NVH levels are maintained during lugging. However, a higher torque converter slip that favors drivability may decrease fuel economy. Therefore, when the occupancy level in the vehicle is lower, such as when the vehicle is being operated autonomously with no occupants, with only a passenger or a passive driver, the lugging NVH tolerance limit may be increased (towards line 820) in order to allow the torque converter operation at lower slip, which improves fuel economy while compromising NVH. Map 850 may be stored in the memory of the controller and may be used to select a torque converter map corresponding to increased NVH tolerance limits, which may be used to determine the desired slip during engine conditions, such as lugging depending on the occupancy level of the vehicle.

In this way, NVH tolerance limits may be increased as occupancy level decreases so that during lugging conditions torque converter slip may be decreased to increase fuel economy while compromising drivability.

Figure 9:
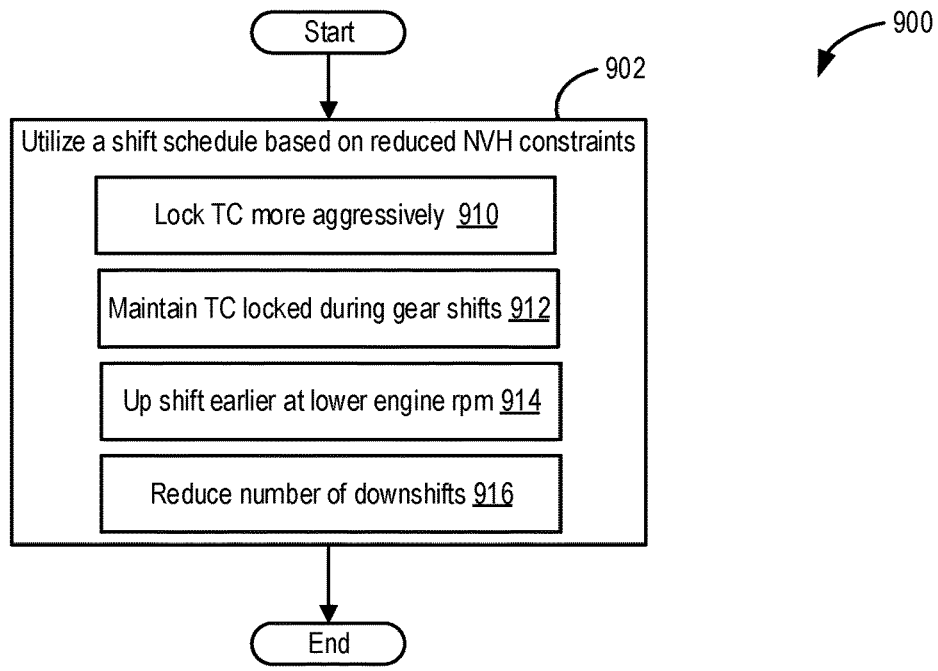
FIG. 9 shows a flowchart illustrating an example method for controlling a transmission shift schedule with reduced NVH constraints at lower vehicle occupancy levels.

Next, FIG. 9 shows a flow chart illustrating an example method 900 for adjusting transmission shifting based on reduced NVH constraints. Specifically, method 900 may be performed as the occupancy level in the vehicle decreases. Method 900 may be performed in coordination with method 300 at FIG. 3. The controller may employ actuators of the vehicle system, such as the actuators described with reference to FIGS. 1A, 1B, and 2, to adjust vehicle operation based on number of occupants.

Method 900 begins at 902. At 902, method 900 includes utilizing a transmission shift schedule based on progressively reduced NVH constraints as the occupancy level decreases. Specifically, upshift and downshift decisions may be based on reduced NVH constraints. The transmission shift schedule based on reduced NVH constraints may favor fuel economy. This includes, at 910, lock the torque converter more aggressively as the occupancy level decreases. For example, a degree of slip of the torque converter may be reduced as the occupancy level decreases. At 912, the method includes maintaining the torque converter locked during transmission gear shifts when the occupancy level is higher, such as higher than a threshold.

At 914, the method includes upshifting early at lower engine rpm. For example, the transmission may launch in higher gears than typically allowed when operating with nominal NVH constraints. At 916, the method includes reducing the number of downshifts. Further still, the controller may instantaneously select the optimal gear for fuel efficiency that meets the vehicle acceleration demand without considering shift quality or shifts that are traditionally difficult to execute smoothly. This allows the transmission to execute shifts without compensating for the torque hole. In this way, transmission shifting may be adjusted for improved fuel economy while compromising NVH based on occupancy level.

Figure 10:
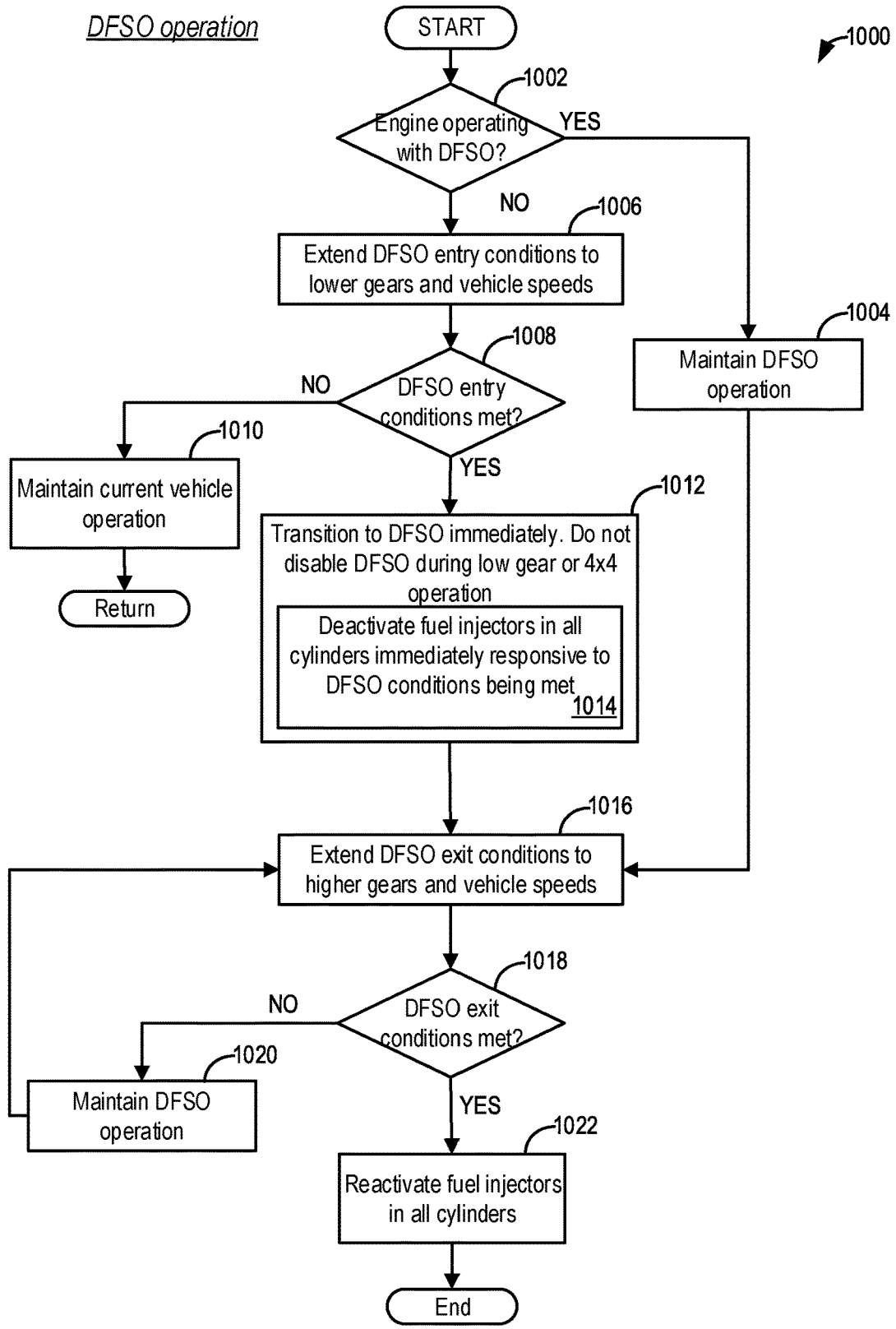
FIG. 10 shows a flowchart illustrating an example method for controlling deceleration fuel shut off (DFSO) operation of the vehicle with reduced NVH constraints at lower vehicle occupancy levels.

Turning next to FIG. 10, a flow chart illustrating an example method 1000 for adjusting DFSO operation based on reduced NVH constraints is shown. Method 1000 may be performed in response to an occupancy level of the vehicle when the vehicle is operating in an autonomous mode. Method 1000 may be performed in coordination with method 300 at FIG. 3. The controller may employ actuators of the vehicle system, such as the actuators described with reference to FIGS. 1A, 1B, and 2, to adjust vehicle operation. In particular, the controller may adjust DFSO operation based on reduced NVH constraints by adjusting operation of a fuel injector, such as fuel injector 69 at FIG. 2, via a fuel injector actuator, to increase fuel economy while compromising NVH, according to the method 1000 described below.

Method 1000 begins at 1002. At 1002, method 1000 includes judging if the engine is operating under deceleration fuel shut off (DFSO) conditions. DFSO condition is a non-fueling condition during which fuel supply is interrupted but the engine continues spinning and at least one intake valve and one exhaust valve are operating; thus, air is flowing through one or more of the cylinders, but fuel is not injected in the cylinders. Under DFSO conditions, fuel injector is deactivated, and combustion is not carried out and ambient air may move through the cylinder from the intake passage to the exhaust passage. Accordingly, DFSO conditions may be confirmed based on fuel injector deactivation in one or more, or all engine cylinders in addition to one or more of vehicle speed, throttle position, engine speed, and engine load. If DFSO conditions are confirmed, the answer at 1002 is YES, and method 1000 proceeds to 1004 to maintain DFSO operation. The method then moves to 1016 to enable DFSO to be maintained over a longer duration of vehicle operation.

If the engine is not currently operating with DFSO, method 1000 proceeds to 1006 to more aggressively enter and re-enter DFSO conditions. This includes relaxing DFSO entry conditions and extending the engine speed, load, and vehicle speed range at which DFSO can be entered. For example, the controller may extend DFSO entry conditions to lower gears and vehicle speeds.

At 1008, it may be determined if the relaxed DFSO entry conditions have been met. DFSO may be initiated responsive to one or more of vehicle speed, vehicle acceleration, engine speed, engine load, throttle position, and transmission gear position, and may occur repeatedly during a drive cycle. In one example, DFSO may be initiated if engine speed is below a threshold speed, the threshold speed lowered relative to nominal settings when the DFSO entry conditions are relaxed for reduced NVH constraints. In another example, DFSO may be initiated if engine load is below a threshold, the threshold load lowered relative to nominal settings when the DFSO entry conditions are relaxed for reduced NVH constraints. In still another example, when operating in an autonomous mode, DFSO may be initiated based on an a throttle position and/or a change in the throttle position for a suitable duration—e.g., DFSO may be initiated if a threshold change in the throttle position indicating deceleration request has occurred, DFSO entered responsive to a smaller threshold change in throttle position relative to nominal settings when the DFSO entry conditions are relaxed for reduced NVH constraints. Additionally or alternatively, DFSO may be initiated if the vehicle has remained in deceleration conditions (e.g., throttle remaining in a threshold open position) for a threshold duration, the threshold duration reduced relative to nominal settings when the DFSO entry conditions are relaxed for reduced NVH constraints. Further, additionally or alternatively, entry into DFSO may be determined based on a commanded signal to cease fuel injection.

If DFSO entry conditions are not met, the answer at 1004 is NO, and method 1000 proceeds to 1020. At 1020, method 1000 includes maintaining current vehicle operation. If DFSO entry conditions are met, the answer at 1008 is YES, and method 1000 proceeds to 1012.

At 1012, method 1000 includes transitioning to DFSO operation immediately. For example, poor drivability may become an issue during deceleration fuel shut off (DFSO). Specifically, poor drivability may result due to transmission or driveline gear lash. For example, when the engine transitions from exerting a positive torque to exerting a negative torque (or being driven), the gears in the transmission or driveline separate at the zero torque transition point. Then, after passing through the zero torque point, the gears again make contact to transfer torque. This series of events produces an impact, or clunk. Further, the effects of transmission gear lash can be amplified depending on the state of the transmission. For example, sensitivity to noise, vibration, and harness (NVH) may be higher in all wheel drive or 4×4 operation, compared with two-wheel drive operation. Further, such sensitivity may also be increased as the overall transmission gear is lower, such as to a 4×4 low gear. When NVH is constrained, in order to improve drivability, deactivation of the fuel injection during deceleration operation is restricted when the vehicle is in an All Wheel Drive, or 4×4, low gear. Further, clunk may be more perceptible or perceptible at certain vehicle speeds less than a clunk threshold. During such conditions as well, DFSO may be disabled. Further, deactivation of fuel injectors may be delayed until engine speed stabilizes in order to reduce NVH. However, limiting DFSO or delaying DFSO impacts fuel economy. Therefore, when NVH constraints are reduced due to reduced occupancy level, while the vehicle is operating autonomously, NVH may be tolerated largely and concern for drivability is reduced.

Thus, when the occupancy level of the vehicle is lower, and the vehicle is operating in an autonomous mode, DFSO operation may be expanded to a wider range of operating conditions, and fuel injection deactivation may be performed immediately upon DFSO entry conditions being met. Specifically, DFSO may be performed during all wheel and/or low gear operation. Further, the clunk threshold may be decreased so that DFSO is performed at lower vehicle speeds. Further still, DFSO may be initiated immediately in response to entry conditions being met, without delaying DFSO until engine speed stabilizes. This includes, at 1014, deactivating fuel injection in all cylinders.

At 1016, the method further includes extending DFSO exit conditions to higher gears and vehicle speeds. At 1018, it may be determined if the relaxed exit conditions have been met. If not, DFSO operation is maintained at 1020. Else, if exit conditions have been met, then at 1022, the cylinder fuel injectors of the deactivated cylinders are reactivated, and combustion is resumed in those cylinders.

For example, it may be determined if the brake has been released or if an amount of brake release is greater than a threshold, where the threshold is based on reduced NVH constraints. When the vehicle is occupancy is lower and the vehicle is operating autonomously, application of brakes may be determined based on brake pressure, for example.

When vehicle occupancy is higher, or when the vehicle is not operating autonomously, in order to mitigate clunk and improve tip-in response, exit from DFSO may be performed early. Specifically, since it takes a certain duration (e.g., amount of time, or number of engine cycles) to re-enable engine firing, a driver may easily feel clunk on exit of DFSO if the injectors, combustion, transmission control and engine torque control do not have adequate time to stabilize. Thus, a driver's tip-in may be anticipated so as to prepare torque control prior to the tip-in event by making use of the brake input and effort. In this way, the engine is given sufficient time to prepare the reactivation of fuel injection. Thus, the engine may provide required torque once the driver tips-in and powertrain NVH may be reduced. However, when the vehicle occupancy is lower, NVH constraints are reduced and fuel economy is prioritized. Therein, an exit from DFSO may be delayed. Accordingly, the threshold amount brake release may be increased (that is, threshold amount of break release for DFSO exit when vehicle occupancy is higher may be less than the threshold amount of brake release for DFSO exit when vehicle occupancy is lower) so that DFSO can be performed more aggressively for an extended amount of time with reduced NVH constraints. In this way, greater fuel economy may be achieved with the vehicle operating in an autonomous mode. Overall, DFSO may be entered and re-entered more aggressively at a wider range of operating conditions, and without delay based on vehicle occupancy so that fuel economy is prioritized over drivability.

Figure 11:
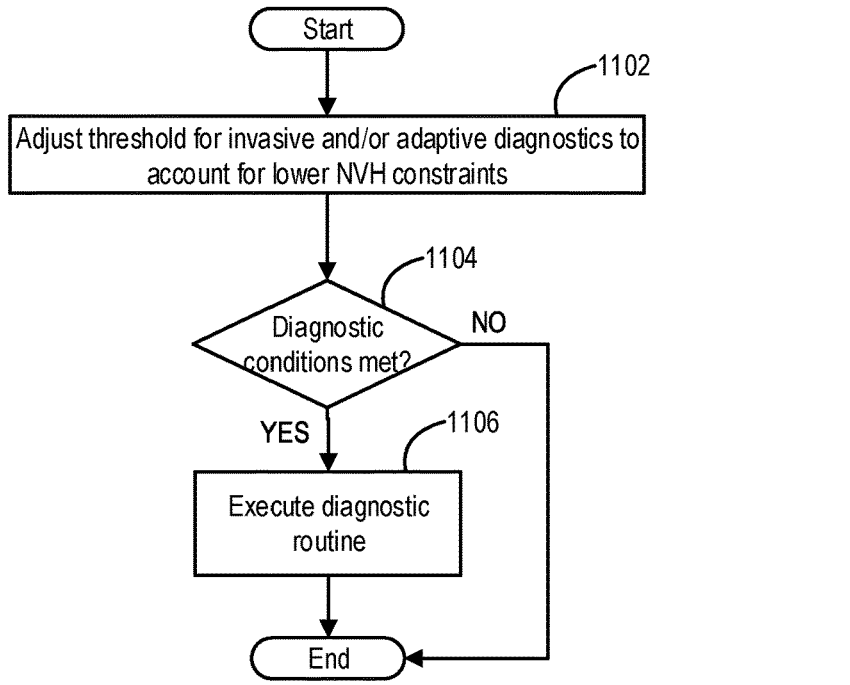
FIG. 11 shows a flowchart illustrating an example method for controlling the schedule of on-board diagnostic routines of the vehicle with reduced NVH constraints at lower vehicle occupancy levels.

Turning now to FIG. 11, a flow chart illustrating an example method 1100 for adjusting the execution schedule of one or more on-board diagnostic routines based on reduced NVH constraints is shown. Method 1100 may be performed in response to an occupancy level of the vehicle when the vehicle is operating in an autonomous mode. Method 1100 may be performed in coordination with method 300 at FIG. 3. The controller may employ actuators of the vehicle system, such as the actuators described with reference to FIGS. 1A, 1B, and 2, to adjust vehicle operation. In particular, the controller may the initiation and/or completion of one or more diagnostic routines and monitors based on reduced NVH constraints to increase fuel economy, according to the method 1100 described below.

Method 1100 begins at 1102. At 1102, method 1100 includes adjusting the threshold for intrusive and/or adaptive diagnostics to account for lower NVH constraints. These include adjusting the entry and/or execution conditions for monitors related to adaptive knock, clutch slip, DPF regeneration, etc. The entry conditions include one or more of engine speed, load, vehicle speed, etc., conditions that need to be satisfied for a monitor to be initiated. The execution conditions include one or more of engine speed, load, vehicle speed, etc., conditions that need to be satisfied for the monitor to continue to run. Typically, the entry and execution conditions may be adjusted to reduce drivability issues. For example, when a knock monitor is run, low grade vibrations and knock may be intentionally induced to determine if the engine's spark control is able to address the knock sufficiently, and in a timely manner. However, the knock related vibrations may be objectionable to a vehicle driver. So the knock monitor execution may be delayed until conditions where the knock is less objectionable, such as when operating the vehicle at high speeds where the ambient noise may mask the knock noise. This can result in the engine operating with insufficient adaptive knock control for a duration until the monitor is run. Therefore, by relaxing (specifically, lowering) the vehicle speed threshold at which the knock monitor can be executed, knock monitor completion is better ensured, which improves adaptive spark application. Due to the lower occupancy level of the vehicle when the NVH constraints are reduced, driveability is not a concern during the execution of the monitor.

At 1104, it may be determined if the relaxed entry conditions for a given monitor have been met. For example, a particular monitor may be initiated responsive to one or more of vehicle speed, vehicle acceleration, engine speed, engine load, throttle position, and transmission gear position, and may occur repeatedly during a drive cycle. In one example, a monitor may be initiated if engine speed is below a threshold speed, the threshold speed lowered relative to nominal settings when the entry conditions are relaxed for reduced NVH constraints. In another example, a monitor may be initiated if engine load is below a threshold, the threshold load lowered relative to nominal settings when the entry conditions are relaxed for reduced NVH constraints. At 1106, responsive to the relaxed entry conditions being met, the monitor is initiated and/or executed.

In this way, greater fuel economy may be achieved with the vehicle operating in an autonomous mode by enabling diagnostics to be completed over a drive cycle. By relaxing monitor entry and execution conditions so that the monitor can be entered and executed more aggressively over a wider range of operating conditions of a drive cycle based on vehicle occupancy, fuel economy is prioritized over drivability.

Figure 12:
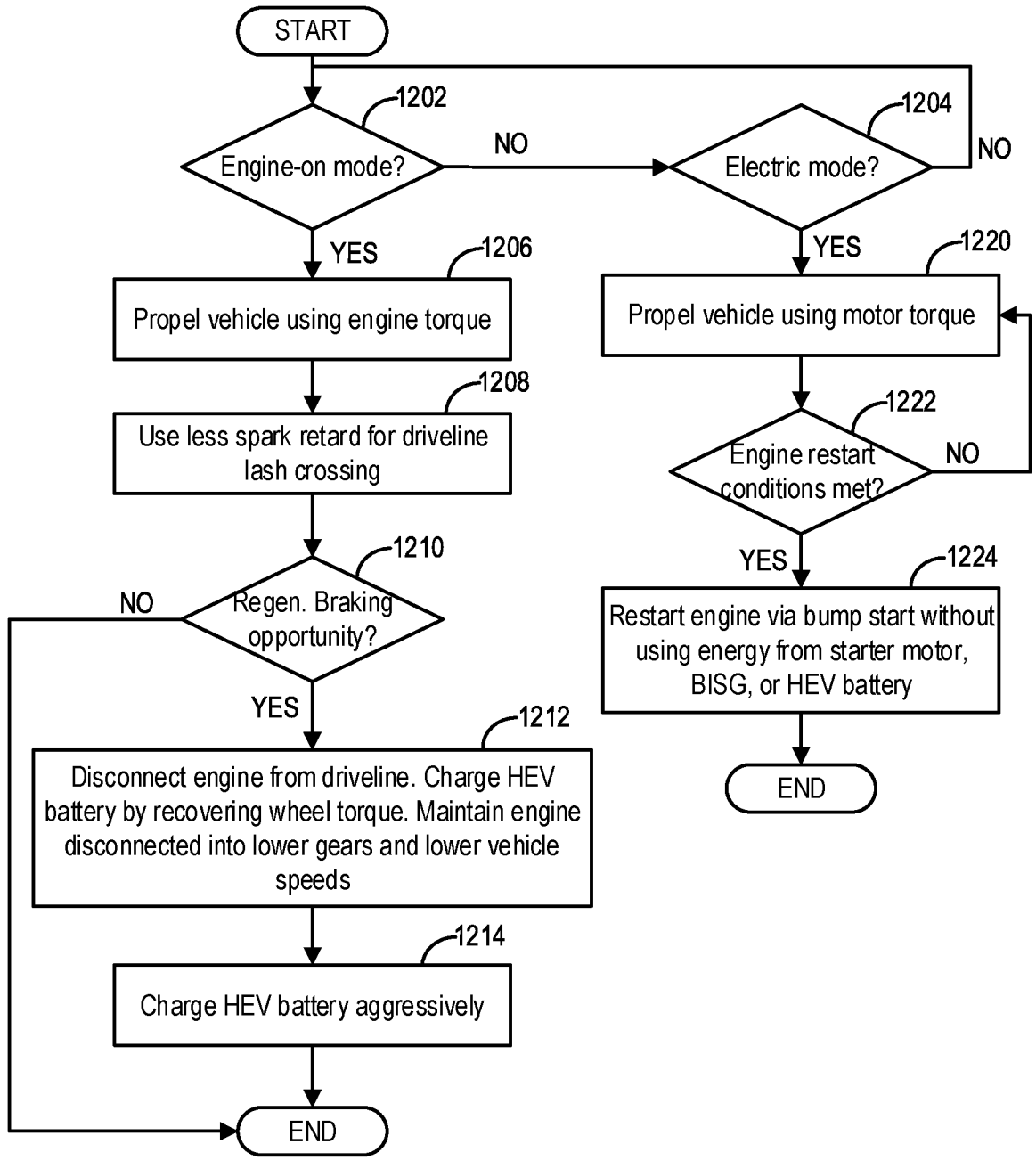
FIG. 12 shows a flowchart illustrating an example method for controlling hybrid vehicle operation with reduced NVH constraints at lower vehicle occupancy levels.
Figure 13:
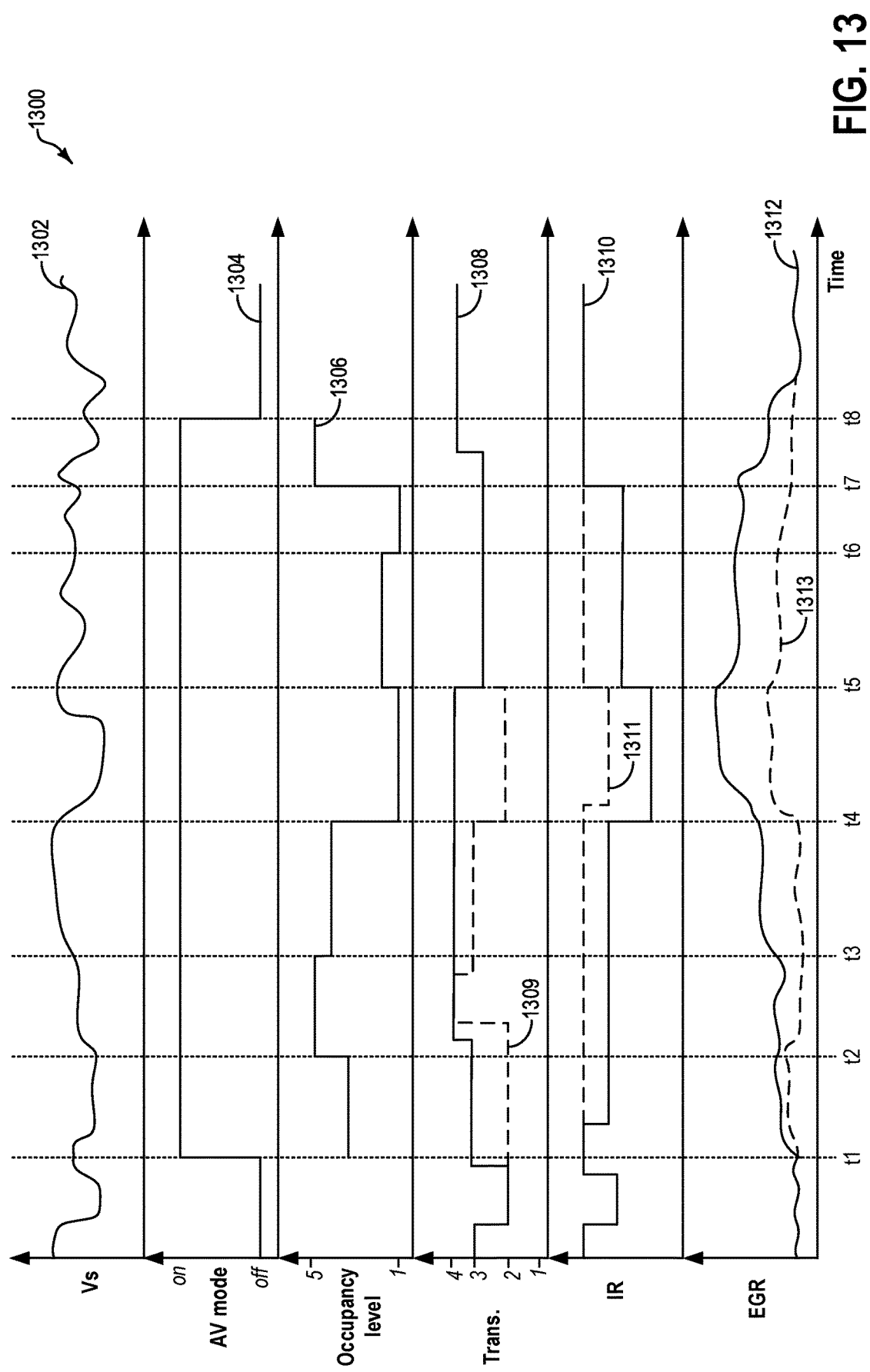
FIG. 13 shows a prophetic example of adjusting vehicle powertrain settings based on occupancy level.

Turning now to FIG. 12, a flow chart illustrating an example method 1200 for adjusting hybrid vehicle operation based on reduced NVH constraints is shown. Method 1200 may be performed in response to an occupancy level of the vehicle when the vehicle is operating in an autonomous mode. Method 1200 may be performed in coordination with method 300 at FIG. 3. The controller may employ actuators of the vehicle system, such as the actuators described with reference to FIGS. 1A, 1B, and 2, to adjust vehicle operation. In particular, the controller may adjust transitions between an engine mode and an electric mode of vehicle propulsion, by adjusting the actuation of engine fuel injectors and the output of an electric motor, such as motor 120 of FIG. 1, based on reduced NVH constraints to increase fuel economy, according to the method 1200 described below.

Method 1200 begins at 1202. At 1202, method 1200 includes determining if the vehicle is operating in an engine-on mode. This includes determining if the engine is combusting fuel and if at least some engine torque is being used to propel the vehicle. In one example, the vehicle is in an engine-on mode when the vehicle is in an engine-only operation (wherein only engine torque is used to propel the vehicle) or in hybrid assist operation (wherein each of engine torque and motor torque is used to propel the vehicle).

If yes, then at 1206, the method includes propelling the vehicle using at least some engine torque. At 1208, responsive to reduced NVH constraints, the method includes reducing spark retard usage for driveline lash crossing. Typically, when a driveline lash region is crossed, a nominal amount of spark retard is used to reduce the NVH associated with the driveline lash so as to improve vehicle drivability. However, the spark retard usage results in fuel economy being compromised. Therefore, when the vehicle is in an autonomous mode, spark retard usage is reduced relative to the nominal amount as the occupancy level decreases. Further still, at the lowest level of occupancy, no spark retard may be applied. Consequently, the vehicle controller may not mitigate driveline shuffle via inefficient spark retard usage. The controller may select the amount of spark retard to apply via a look-up table that uses transmission gear, engine speed, and engine load as inputs, to generate the spark amount as an output.

At 1210, while operating in the engine-on mode, it may be determined if a regenerative braking opportunity is available, such as during a deceleration event. In one example, during a deceleration event, such as when an operator releases an accelerator pedal or applies a brake pedal, vehicle speed may be reduced by recuperating the wheel torque and using it to operate the electric motor of the HEV as a generator. As a result, wheel torque is recuperated and saved as electric energy in a system battery. By decelerating the vehicle via recuperating the wheel torque, the need for brake application is reduced, improving vehicle fuel economy.

If a regenerative braking energy opportunity is available while operating in the autonomous mode, then at 1212, the method includes disconnecting the engine from the driveline, such as by slipping the torque converter clutch to unlock it. The controller may then charge the HEV battery by recovering wheel torque. During the battery charging, the engine may remain decoupled from the driveline. This may include maintaining the engine disconnected even into lower gears and lower vehicle speeds responsive to a reduced occupancy level of the vehicle. This allows the vehicle to recover more of the regenerative braking energy. As one example, as the occupancy level decreases, the engine may remain disconnected into progressively lower gears and lower vehicle speeds relative to a speed and gear setting used when nominal NVH constraints are applied. As a result, at 1214, the HEV battery may be charged more aggressively as the occupancy level decreases while the vehicle is in the autonomous mode. This allows the vehicle to be better prepared for more electric mode operation (EV operation) to support a forthcoming passenger transport mission.

Returning to 1202, if an engine-on mode is not confirmed, then at 1204, an electric mode may be confirmed. Upon confirming the electric mode, at 1220, the method includes propelling the vehicle using motor torque from an electric motor of the system. At 1222, it may be determined if engine restart conditions are met. In one example, the engine may be restarted responsive to a drop in the battery's state of charge (SOC) below a threshold SOC. In another example, the engine may be restarted if the driver torque demand is larger than can be met only via the electric motor. If engine restart conditions are not met, then the method returns to 1220 to continue using motor torque to propel the engine. Else, if engine restart conditions are met, then at 1224, the method includes restarting the engine via bump start without using energy from starter motor, BISG, or HEV battery.

It will be appreciated that for each of the various powertrain calibration settings and schedules selected, such as those discussed at FIGS. 5-12, the controller may refer to a look-up table that uses engine speed, load, and the determined occupancy level as inputs in selecting the corresponding NVH constraint and the associated calibration setting. In one example, the calibration setting corresponding to a highest occupancy level while the vehicle is in an autonomous mode may be more relaxed and biased towards fuel economy than a nominal calibration setting used when the vehicle is not operated in the autonomous mode. Then as the occupancy level decreases, the settings may be further relaxed and further biased towards fuel economy (over drivability). In another example, the calibration setting corresponding to a highest occupancy level while the vehicle is in an autonomous mode may the same as the nominal calibration setting used when the vehicle is not operated in the autonomous mode.

It will be further appreciated that as the vehicle operating mode and occupancy level changes over a drive cycle, the calibration settings may be dynamically adjusted. A prophetic example of dynamically changing vehicle powertrain calibration settings over a drive cycle as the vehicle's occupancy level changes, and further as the vehicle shifts in and out of autonomous operation, is shown at FIG. 13. Specifically, map 1300 depicts vehicle speed at plot 1302, the vehicle speed being indicative of operator torque demand. Plot 1304 depicts whether an autonomous mode of vehicle operation (AV mode) is actuated on or off. An occupancy level of the vehicle when in the AV mode, as determined via sensor input, is shown at plot 1306. A transmission gear ratio is shown at plot 1308. An engine induction ratio (IR) that may be selected during a variable displacement mode is shown at plot 1310. When all cylinders are active, the IR is 1.0. As cylinders are selectively deactivated, the IR drops. For example, when every alternate cylinder is deactivated, the IR is reduced to 0.5. An EGR flow rate is shown at plot 1312. When the EGR flow rate is higher, the engine dilution level is higher. EGR flow rate changes are enabled via adjustments to the opening of an EGR valve recirculating exhaust gas from an exhaust passage, downstream of an exhaust catalyst, to an intake passage, upstream of an intake throttle. All plots are shown over time along the x-axis.

Prior to t1, the vehicle is not operating in the AV mode. Therefore at time, the occupancy level is moot as all engine calibration settings are set to nominal NVH constraints wherein NVH is biased over fuel economy. However, the vehicle may be operating with a driver seated in a front of the vehicle, and multiple passengers seated in a rear of the vehicle. At this time, due to the elevated load, all engine cylinders are firing, as indicated by an IR of 1.0. The transmission is set to a third gear. EGR is being provided at a nominal level.

As the torque demand changes between t0 and t1, the transmission is downshifted to a lower gear (herein from the third gear to a second gear) and one of more cylinders are deactivated to operate the engine at a lower induction ratio. For example, the IR may be shifted from 1.0 to 0.67 by deactivating one of four engine cylinders.

At t1, the primary occupant of the vehicle, that is the driver, changes the vehicle operating mode to an autonomous vehicle (AV) mode, such as by selecting a button on a vehicle interface, which may be a dashboard or a display. For example, the driver may drive the vehicle to a highway between t0 and t1, and at t1, upon reaching the highway, the driver may select the AV mode button. However, none of the occupants get out of the vehicle and so the occupancy level remains elevated, such as at a fourth level of occupancy due to the vehicle driver being present but not interacting with vehicle steering and pedal controls.

Between t1 and t8, while still in the AV mode, the occupancy level of the vehicle changes. For example, the occupancy level may increase due to a driver being active with the steering and pedal controls, or due to an occupant entering the vehicle. As another example, the occupancy level may decrease due to one or all of the vehicle occupants exiting the vehicle, due to a driver moving to a passenger seat, or due to a driver taking on a more passive role where they are not interacting with steering and pedal controls. As the occupancy level changes, responsive to the changing torque demand, the engine dilution provided via EGR, an induction ratio, and a transmission gear shift schedule is varied.

For example, at t2, while in the AV mode, the vehicle driver starts to temporarily interact with steering controls, such as by operating the steering wheel while the vehicle controller continues to manage the pedal controls. Responsive to the operator interaction, the determined occupancy level is raised. Due to the elevated occupancy level, as the torque demand changes, transmission shifts are enabled with a schedule that is biased more towards NVH than towards fuel economy. However, the transmission shift schedule at the elevated occupancy level is still more biased towards fuel economy than a nominal schedule that is NVH constrained (shown for reference by dashed line 1309), as would have been applied if the vehicle were not in the AV mode. For example, the transmission shift schedule includes fewer downshifts and earlier upshifts as compared to the nominal schedule 1309.

As another example, the VDE transitions enabled while in the AV mode with varying occupancy level is more biased towards fuel economy than a nominal schedule that is NVH constrained (shown for reference by dashed line 1311), as would have been applied if the vehicle were not in the AV mode. For example, the VDE mode transitions include earlier transitions to lower induction ratios, and longer periods of engine operation with cylinder deactivation.

As another example, the EGR flow enabled while in the AV mode with varying occupancy level is more biased towards fuel economy than a nominal schedule that is NVH constrained (shown for reference by dashed line 1313), as would have been applied if the vehicle were not in the AV mode. For example, more EGR flow is provided at higher engine loads, enabling the engine dilution benefits to be provided over longer periods of engine operation.

At t8, the vehicle driver disables the autonomous mode of vehicle driving. Accordingly, powertrain calibrations are returned to nominal settings where the calibration is optimized for improved drivability and NVH at the cost of fuel economy.

In this way, vehicle calibration may be optimized as a function of vehicle occupancy level when in an autonomous mode of operation. By dynamically adjusting the settings as occupancy level changes over a drive cycle, engine component settings can be biased further towards fuel economy while reducing NVH constraints. This allow additional fuel economy benefits to be achieved while in an autonomous mode of vehicle operation. By judging the occupancy level based on a number and location of occupants in the vehicle, as well as based on an interaction level of a primary occupant with vehicle controls, an appropriate bias between fuel economy and NVH can be determined while allows fuel economy to be improved without degrading the drive quality perceived by an occupant.

One example method for operating a vehicle, comprises during an autonomous mode of vehicle operation, estimating an occupancy level of the vehicle based on a number of occupants, a position of each occupant within the vehicle, and a drive activity level of a primary occupant; and altering noise, vibration, and harshness (NVH) limits for a powertrain of the vehicle responsive to the occupancy level. In the preceding example, additionally or optionally, estimating the occupancy level of the vehicle based on a position of each occupant within the vehicle includes estimating based on whether an occupant is seated in a driver seat or a passenger seat, and further if the passenger seat is in a front or a rear of the vehicle. In any or all of the preceding examples, additionally or optionally, estimating the occupancy level of the vehicle based on the drive activity level of the primary occupant includes estimating whether the primary occupant is actuating one or more of a steering wheel, an accelerator pedal, and a brake pedal of the vehicle. In any or all of the preceding examples, additionally or optionally, the estimating is based on sensor input received from one or more sensors including a seat occupancy sensor, a pressure sensor, a capacitative touch sensor, an infra-red sensor. In any or all of the preceding examples, additionally or optionally, the estimating is further based on input from one or more of a camera, a microphone, communication received from a cloud dispatch, and communication received from another vehicle via V2X communication. In any or all of the preceding examples, additionally or optionally, altering the NVH limits responsive to the occupancy level includes increasing an NVH threshold relative to a nominal NVH threshold as the occupancy level decreases, the nominal NVH threshold applied when the vehicle is not in the autonomous mode of operation, and adjusting one or more parameters of powertrain operation based on the increasing NVH threshold. In any or all of the preceding examples, additionally or optionally, the powertrain includes an engine coupled to a transmission through a torque converter and wherein adjusting one or more parameters of the powertrain based on the increasing NVH threshold includes adjusting one or more of an idle operation of the engine, a variable displacement engine (VDE) mode of engine operation, a torque converter slip, shut off fuel supplied to the engine during deceleration (DFSO) operation, a transmission shift schedule, a variable cam timing setting, and an exhaust gas recirculation percentage of recirculated exhaust gas and air inducted into the engine for combustion. In any or all of the preceding examples, additionally or optionally, adjusting one or more powertrain parameters based on the increasing NVH threshold further includes, at a given engine speed and load, operating at a lower than nominal induction ratio as the occupancy level decreases and the NVH threshold increases, switching to the variable displacement engine (VDE) mode of engine operation during an idle condition, and increasing an amount of spark retard applied to engine combustion during the idle condition. In any or all of the preceding examples, additionally or optionally, adjusting one or more powertrain parameters based on the increasing NVH threshold further decreasing torque converter slip as the occupancy level decreases and NVH threshold increases. In any or all of the preceding examples, additionally or optionally, the method further comprises reducing an accessory load applied by an air conditioning unit of the vehicle as the occupancy level decreases. In any or all of the preceding examples, additionally or optionally, adjusting one or more powertrain parameters based on the increasing NVH threshold further includes, responsive to a deceleration greater than a threshold, transitioning immediately to a deceleration fuel shut off (DFSO) operation during which fuel supplied to an engine of the powertrain for combustion is shut off, where the threshold is based on the increasing NVH limit, and delaying exit from the deceleration fuel shut off (DFSO) operation to a lower a vehicle speed threshold below which deactivated fuel injectors are reactivated. In any or all of the preceding examples, additionally or optionally, the powertrain further includes an electric motor and wherein adjusting one or more parameters of the powertrain based on the increasing NVH threshold includes, during vehicle deceleration, reducing vehicle speed by recuperating wheel torque via the electric motor to charge a system battery while disconnecting the engine from the powertrain, the engine maintained disconnected into a lower transmission gear and/or a lower vehicle speed as the occupancy level decreases. In any or all of the preceding examples, additionally or optionally, the method further comprises intrusively initiating one or more on-board diagnostic routines of the vehicle responsive to the increased NVH limits, the diagnostic routines initiated at one or more of a lower vehicle speed, a lower engine speed, and a lower engine load as the occupancy level decreases.

Another example method for a vehicle comprises: setting different noise vibration and harshness (NVH) limits for a vehicle powertrain based a sensed occupancy level of the vehicle, the occupancy level sensed while the vehicle is in an autonomous mode of operation based on each of a number of occupants in the vehicle, a position of each occupant within the vehicle, and a degree of interaction of a primary occupant with vehicle steering and pedal controls. In any or all of the preceding examples, additionally or optionally, setting different NVH limits includes: responsive to detecting zero occupants, indicating a first, lowest occupancy level and setting a first NVH tolerance threshold, higher than a nominal threshold; responsive to detecting only passenger occupants, indicating a second occupancy level, higher than the first occupancy level, and setting a second threshold, higher than the first NVH tolerance threshold; responsive to detecting a passive driver occupant, indicating a third occupancy level, higher than the second occupancy level, and setting a third threshold, higher than the second NVH tolerance threshold; responsive to the driver occupant interacting with only one of a vehicle steering and a braking control, indicating a fourth occupancy level, higher than the third occupancy level, and setting a fourth threshold, higher than the third NVH tolerance threshold; responsive to the driver occupant interacting with each of the vehicle steering and braking control, indicating a fifth occupancy level, higher than the fourth occupancy level, and setting a fifth threshold, higher than the fourth NVH tolerance threshold; and selecting a vehicle component calibration setting based on the NVH limit. In any or all of the preceding examples, additionally or optionally, selecting the vehicle component calibration setting based on the NVH limit includes: as the NVH limit moves from the first threshold to the fifth threshold, reducing a vehicle speed at which a transmission upshift is enabled and cylinder fueling is disabled, and reducing an accessory load applied by an air conditioning system on an engine. In any or all of the preceding examples, additionally or optionally, the selecting further includes increasing one or more of a desired EGR amount, and an operating range of DFSO operation as the NVH limit moves from the first threshold to the fifth threshold. In any or all of the preceding examples, additionally or optionally, the powertrain includes an engine and an electric motor coupled to a transmission through a torque converter, and adjusting one or more operating parameters of the vehicle includes one or more of decreasing a percentage of torque converter slip as the NVH limit moves from the first threshold to the fifth threshold.

Another example vehicle system, comprises a variable displacement engine (VDE) including a plurality of cylinders, where one or more of the cylinders are deactivated in a variable displacement mode of engine operation, the engine being coupled to a transmission through a torque converter; an occupant sensing system for detecting presence of an occupant within the vehicle, the occupant sensing system including one or more seat pressure sensors coupled to each vehicle seat; one or more autonomous driving sensors; an in-vehicle computing system including an autonomous driving module, the autonomous driving module including instructions for operating the vehicle in an autonomous mode based on signals received from the one or more autonomous driving sensors; and a processor and a storage device, the storage device storing instructions executable by the processor to: estimate an occupancy level of the vehicle based on a number, location, and activity level of occupants within the vehicle; during a first condition including when the occupancy level is higher than a threshold, adjusting one or more vehicle operating parameters based on a lower noise, vibration, and harshness (NVH) threshold of the vehicle; and during a second condition including when the occupancy level is lower than the threshold, adjusting the one or more vehicle operating parameters based on a higher NVH threshold of the vehicle for increasing fuel economy improvement while compromising NVH; wherein the one or more vehicle operating parameters include a desired amount of exhaust gas recirculated into the engine (EGR), a first engine speed and load range for variable displacement operation, a number of cylinders deactivated during the variable displacement mode, a second engine speed and load range for shut off of fuel supplied to the engine during deceleration (DFSO) operation, torque converter slip, an accessory load applied on the engine, and a transmission shift schedule. In any or all of the preceding examples, additionally or optionally, adjusting one or more vehicle operating parameters based on the higher NVH threshold includes increasing the desired EGR amount, reducing the first speed and load range for variable displacement operation, reducing the number of cylinders deactivated during the variable displacement mode, reducing the second engine speed and load range for DFSO operation, decreasing torque converter slip, and decreasing the accessory load applied on the engine as the occupancy level decreases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
during an autonomous mode of vehicle operation,
estimating an occupancy level of the vehicle based on a number of occupants, a position of each occupant within the vehicle, and a drive activity level of a primary occupant; and
altering noise, vibration, and harshness (NVH) limits for a powertrain of the vehicle responsive to the occupancy level, wherein altering the NVH limits responsive to the occupancy level includes increasing an NVH threshold relative to a nominal NVH threshold as the occupancy level decreases, the nominal NVH threshold applied when the vehicle is not in the autonomous mode of operation, and adjusting one or more parameters of powertrain operation based on the increasing NVH threshold, wherein the powertrain includes an engine coupled to a transmission through a torque converter and wherein adjusting one or more parameters of the powertrain based on the increasing NVH threshold includes adjusting one or more of an idle operation of the engine, a variable displacement engine (VDE) mode of engine operation, a torque converter slip, shut off fuel supplied to the engine during deceleration (DFSO) operation, a transmission shift schedule, a variable cam timing setting, and an exhaust gas recirculation percentage of recirculated exhaust gas and air inducted into the engine for combustion.

2. The method of claim 1, wherein estimating the occupancy level of the vehicle based on a position of each occupant within the vehicle includes estimating based on whether an occupant is seated in a driver seat or a passenger seat, and further if the passenger seat is in a front or a rear of the vehicle.

3. The method of claim 1, wherein estimating the occupancy level of the vehicle based on the drive activity level of the primary occupant includes estimating whether the primary occupant is actuating one or more of a steering wheel, an accelerator pedal, and a brake pedal of the vehicle.

4. The method of claim 1, wherein the estimating is based on sensor input received from one or more sensors including a seat occupancy sensor, a pressure sensor, a capacitative touch sensor, an infra-red sensor.

5. The method of claim 4, wherein the estimating is further based on input from one or more of a camera, a microphone, communication received from a cloud dispatch, and communication received from another vehicle via V2X communication.

6. The method of claim 1, wherein adjusting one or more powertrain parameters based on the increasing NVH threshold further includes, at a given engine speed and load, operating at a lower than nominal induction ratio as the occupancy level decreases and the NVH threshold increases, switching to the variable displacement engine (VDE) mode of engine operation during an idle condition, and increasing an amount of spark retard applied to engine combustion during the idle condition.

7. The method of claim 1, wherein adjusting one or more powertrain parameters based on the increasing NVH threshold further decreasing torque converter slip as the occupancy level decreases and NVH threshold increases.

8. The method of claim 1, wherein adjusting one or more powertrain parameters based on the increasing NVH threshold further includes, responsive to a deceleration greater than a threshold, transitioning immediately to a deceleration fuel shut off (DFSO) operation during which fuel supplied to an engine of the powertrain for combustion is shut off, where the threshold is based on the increasing NVH limit, and delaying exit from the deceleration fuel shut off (DFSO) operation to a lower a vehicle speed threshold below which deactivated fuel injectors are reactivated.

9. The method of claim 1, further comprising, reducing an accessory load applied by an air conditioning unit of the vehicle as the occupancy level decreases.

10. The method of claim 1, wherein the powertrain further includes an electric motor and wherein adjusting one or more parameters of the powertrain based on the increasing NVH threshold includes, during vehicle deceleration, reducing vehicle speed by recuperating wheel torque via the electric motor to charge a system battery while disconnecting the engine from the powertrain, the engine maintained disconnected into a lower transmission gear and/or a lower vehicle speed as the occupancy level decreases.

11. The method of claim 10, wherein selecting the vehicle component calibration setting based on the NVH limit includes:
as the NVH limit moves from the first threshold to the fifth threshold, reducing a vehicle speed at which a transmission upshift is enabled and cylinder fueling is disabled, and reducing an accessory load applied by an air conditioning system on an engine.

12. The method of claim 11, wherein the selecting further includes increasing one or more of a desired EGR amount, and an operating range of DFSO operation as the NVH limit moves from the first threshold to the fifth threshold.

13. The method of claim 11, wherein the powertrain includes an engine and an electric motor coupled to a transmission through a torque converter, and adjusting one or more operating parameters of the vehicle includes one or more of decreasing a percentage of torque converter slip as the NVH limit moves from the first threshold to the fifth threshold.

14. The method of claim 1, further comprising:
intrusively initiating one or more on-board diagnostic routines of the vehicle responsive to the increased NVH limits, the diagnostic routines initiated at one or more of a lower vehicle speed, a lower engine speed, and a lower engine load as the occupancy level decreases.

15. A method for a vehicle, comprising:
setting different noise vibration and harshness (NVH) limits for a vehicle powertrain based a sensed occupancy level of the vehicle, the occupancy level sensed while the vehicle is in an autonomous mode of operation based on each of a number of occupants in the vehicle, a position of each occupant within the vehicle, and a degree of interaction of a primary occupant with vehicle steering and pedal controls, wherein setting different NVH limits includes: responsive to detecting zero occupants, indicating a first, lowest occupancy level and setting a first NVH tolerance threshold, higher than a nominal threshold; responsive to detecting only passenger occupants, indicating a second occupancy level, higher than the first occupancy level, and setting a second threshold, higher than the first NVH tolerance threshold; responsive to detecting a passive driver occupant, indicating a third occupancy level, higher than the second occupancy level, and setting a third threshold, higher than the second NVH tolerance threshold; responsive to the driver occupant interacting with only one of a vehicle steering and a braking control, indicating a fourth occupancy level, higher than the third occupancy level, and setting a fourth threshold, higher than the third NVH tolerance threshold; responsive to the driver occupant interacting with each of the vehicle steering and braking control, indicating a fifth occupancy level, higher than the fourth occupancy level, and setting a fifth threshold, higher than the fourth NVH tolerance threshold; and selecting a vehicle component calibration setting based on the NVH limit.

16. A vehicle system, comprising:
a variable displacement engine (VDE) including a plurality of cylinders, where one or more of the cylinders are deactivated in a variable displacement mode of engine operation, the engine being coupled to a transmission through a torque converter;
an occupant sensing system for detecting presence of an occupant within the vehicle, the occupant sensing system including one or more seat pressure sensors coupled to each vehicle seat;
one or more autonomous driving sensors;
an in-vehicle computing system including an autonomous driving module, the autonomous driving module including instructions for operating the vehicle in an autonomous mode based on signals received from the one or more autonomous driving sensors; and a processor and a storage device, the storage device storing instructions executable by the processor to:
estimate an occupancy level of the vehicle based on a number, location, and activity level of occupants within the vehicle;
during a first condition including when the occupancy level is higher than a threshold, adjusting one or more vehicle operating parameters based on a lower noise, vibration, and harshness (NVH) threshold of the vehicle; and
during a second condition including when the occupancy level is lower than the threshold, adjusting the one or more vehicle operating parameters based on a higher NVH threshold of the vehicle for increasing fuel economy improvement while compromising NVH;
wherein the one or more vehicle operating parameters include a desired amount of exhaust gas recirculated into the engine (EGR), a first engine speed and load range for variable displacement operation, a number of cylinders deactivated during the variable displacement mode, a second engine speed and load range for shut off of fuel supplied to the engine during deceleration (DFSO) operation, torque converter slip, an accessory load applied on the engine, and a transmission shift schedule.

17. The system of claim 16, wherein adjusting one or more vehicle operating parameters based on the higher NVH threshold includes increasing the desired EGR amount, reducing the first speed and load range for variable displacement operation, reducing the number of cylinders deactivated during the variable displacement mode, reducing the second engine speed and load range for DFSO operation, decreasing torque converter slip, and decreasing the accessory load applied on the engine as the occupancy level decreases.

* * * * *